(12) United States Patent
Piao

(10) Patent No.: US 10,687,061 B2
(45) Date of Patent: Jun. 16, 2020

(54) ENCODING SEQUENCE ENCODING METHOD AND DEVICE THEREOF, AND DECODING METHOD AND DEVICE THEREOF

(71) Applicant: SAMSUNG ELECTRONICS CO., LTD., Suwon-si (KR)

(72) Inventor: Yin-ji Piao, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/771,267

(22) PCT Filed: Nov. 23, 2016

(86) PCT No.: PCT/KR2016/013527
§ 371 (c)(1),
(2) Date: May 3, 2018

(87) PCT Pub. No.: WO2017/090967
PCT Pub. Date: Jun. 1, 2017

(65) Prior Publication Data
US 2018/0324434 A1 Nov. 8, 2018

Related U.S. Application Data

(60) Provisional application No. 62/259,374, filed on Nov. 24, 2015.

(51) Int. Cl.
*H04N 19/129* (2014.01)
*H04N 19/593* (2014.01)
(Continued)

(52) U.S. Cl.
CPC .......... *H04N 19/129* (2014.11); *H04N 19/11* (2014.11); *H04N 19/119* (2014.11);
(Continued)

(58) Field of Classification Search
None
See application file for complete search history.

(56) References Cited

U.S. PATENT DOCUMENTS

| 6,724,818 B1 | 4/2004 | Fröjdh et al. |
| 8,204,322 B2 | 6/2012 | Imajo |

(Continued)

FOREIGN PATENT DOCUMENTS

| KR | 10-0978152 B1 | 8/2010 |
| KR | 10-1427229 B1 | 8/2014 |

(Continued)

OTHER PUBLICATIONS

Shiodera et al., "Block Based Extra-Inter-Polating Prediction for Intra Coding," 2007 IEEE International Conference on Image Processing, vol. 6. IEEE, 2007. (Year: 2007).*

(Continued)

*Primary Examiner* — Christopher Braniff
(74) *Attorney, Agent, or Firm* — Sughrue Mion, PLLC

(57) ABSTRACT

Provided is a video decoding method including obtaining encoding order information indicating whether an encoding order of a first block and a second block that are adjacent to each other is changed; determining the encoding order of the first block and the second block, based on the encoding order information; and decoding the first block and the second block, according to the determined encoding order.

7 Claims, 23 Drawing Sheets

(51) Int. Cl.
    *H04N 19/119*     (2014.01)
    *H04N 19/96*     (2014.01)
    *H04N 19/11*     (2014.01)
    *H04N 19/70*     (2014.01)
    *H04N 19/44*     (2014.01)
    *H04N 19/176*     (2014.01)
    *H04N 19/52*     (2014.01)
    *H04N 19/46*     (2014.01)

(52) U.S. Cl.
    CPC ........... *H04N 19/176* (2014.11); *H04N 19/44* (2014.11); *H04N 19/593* (2014.11); *H04N 19/70* (2014.11); *H04N 19/96* (2014.11); *H04N 19/52* (2014.11)

(56) References Cited

U.S. PATENT DOCUMENTS

| | | | |
|---|---|---|---|
| 9,571,845 B2 | 2/2017 | Lee et al. | |
| 2008/0240585 A1* | 10/2008 | Imajo | H04N 19/176 382/232 |
| 2009/0279801 A1 | 11/2009 | Ohmiya et al. | |
| 2012/0314767 A1* | 12/2012 | Wang | H04N 19/105 375/240.12 |
| 2013/0003834 A1 | 1/2013 | Rojals et al. | |
| 2014/0341283 A1 | 11/2014 | Choi et al. | |
| 2015/0023406 A1 | 1/2015 | Lee et al. | |

FOREIGN PATENT DOCUMENTS

| | | |
|---|---|---|
| KR | 10-1487686 B1 | 1/2015 |
| KR | 10-2015-0092054 A | 8/2015 |

OTHER PUBLICATIONS

Search Report dated Mar. 10, 2017, issued by the International Searching Authority in counterpart International Patent Application No. PCT/KR2016/013527 (PCT/ISA/210).

Written Opinion dated Mar. 10, 2017, issued by the International Searching Authority in counterpart International Patent Application No. PCT/KR2016/013527 (PCT/ISA/237).

Anonymous, "Infrastructure of audiovisual services—Coding of moving video", Apr. 2013, Series H: Audiovisual and Multimedia Systems, H.265, International Telecommunication Union, 317 pages total.

Communication dated Sep. 24, 2018 issued by the European Patent Office in Counterpart European Application No. 16868863.8.

Tanizawa et al., "Improvement of intra coding by Bidirectional Intra Prediction and 1 Dimensional Directional Unified Transform", Joint Collaborative Team on Video Coding (JCT-VC) of ITU-T SG16 WP3 and ISO/IEC JTC1/SC29/WG11, JCTVC-B042, Jul. 2010, 5 total pages, XP030007622.

\* cited by examiner

FIG. 3
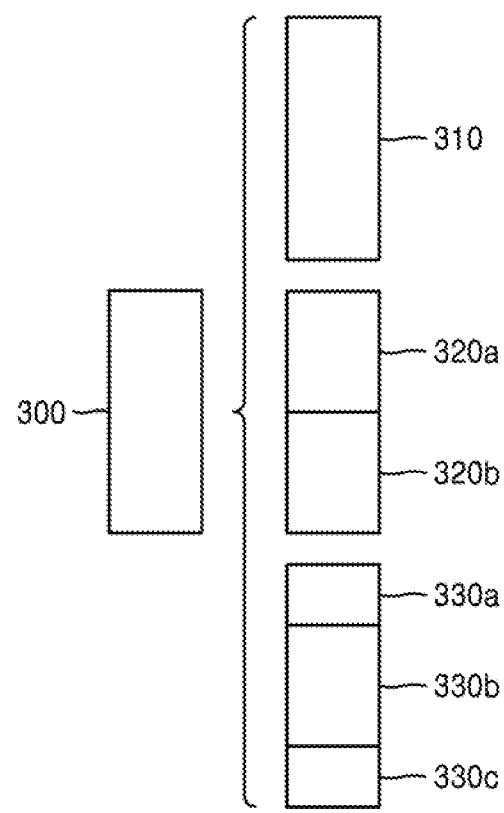
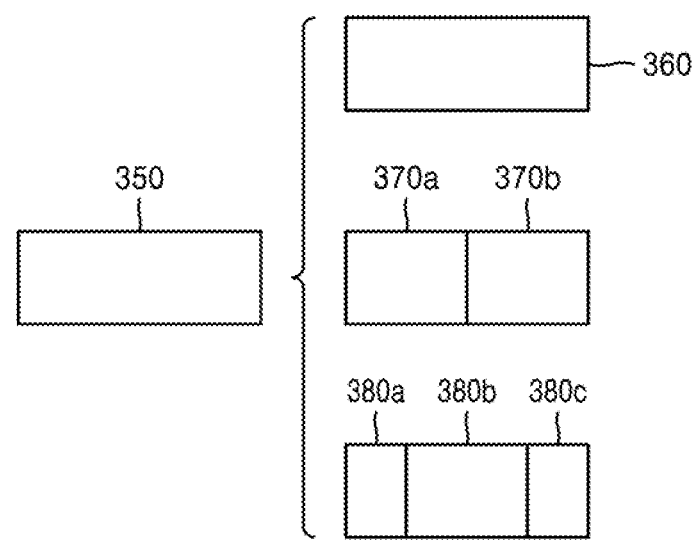

FIG. 12

| BLOCK SHAPE / DEPTH | 0: SQUARE | 1: NS_VER | 2: NS_HOR |
|---|---|---|---|
| DEPTH D | 1200 | 1210 | 1220 |
| DEPTH D+1 | 1202 | 1212 | 1222 |
| DEPTH D+2 | 1204 | 1214 | 1224 |
| ... | ... | ... | ... |

FIG. 22E
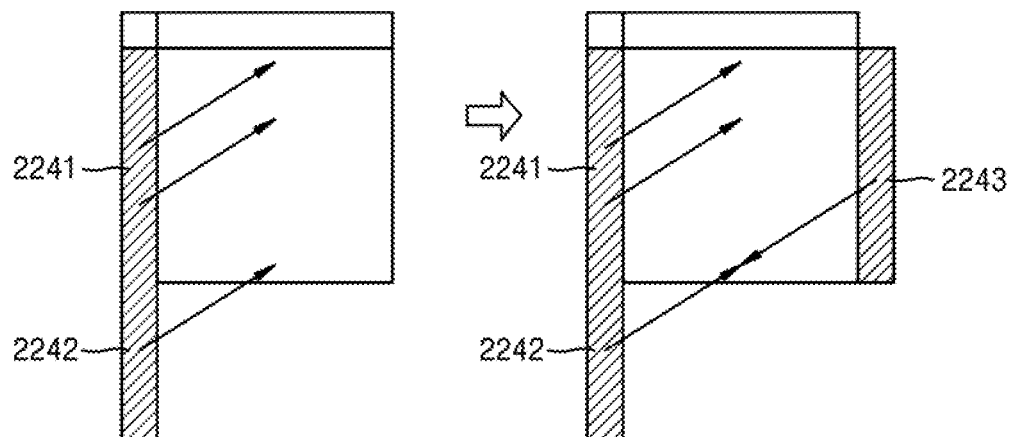
FIG. 23
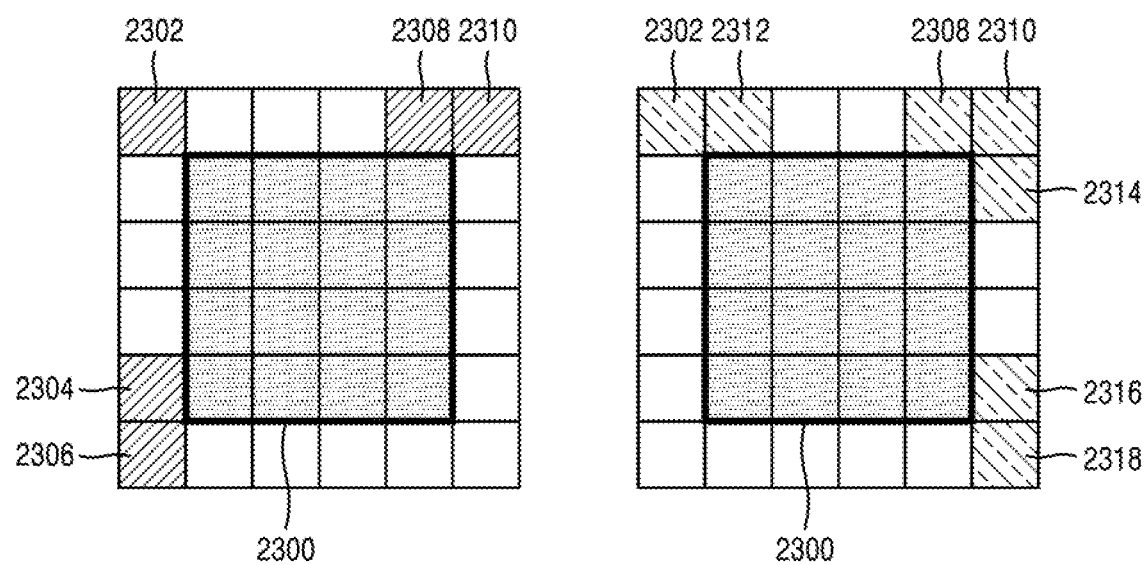
 RIGHT CANDIDATE LIST
 LEFT CANDIDATE LIST

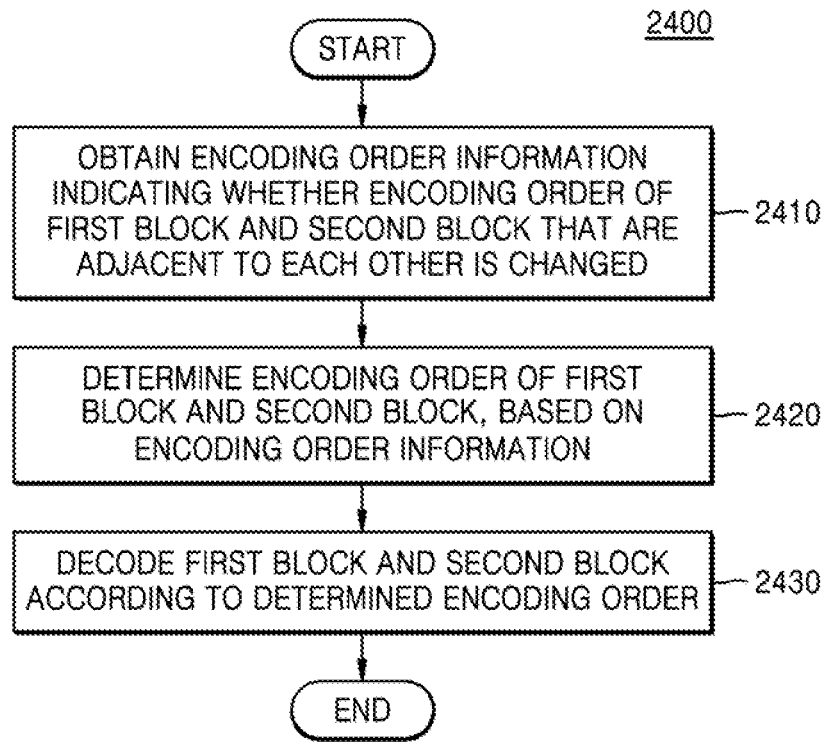
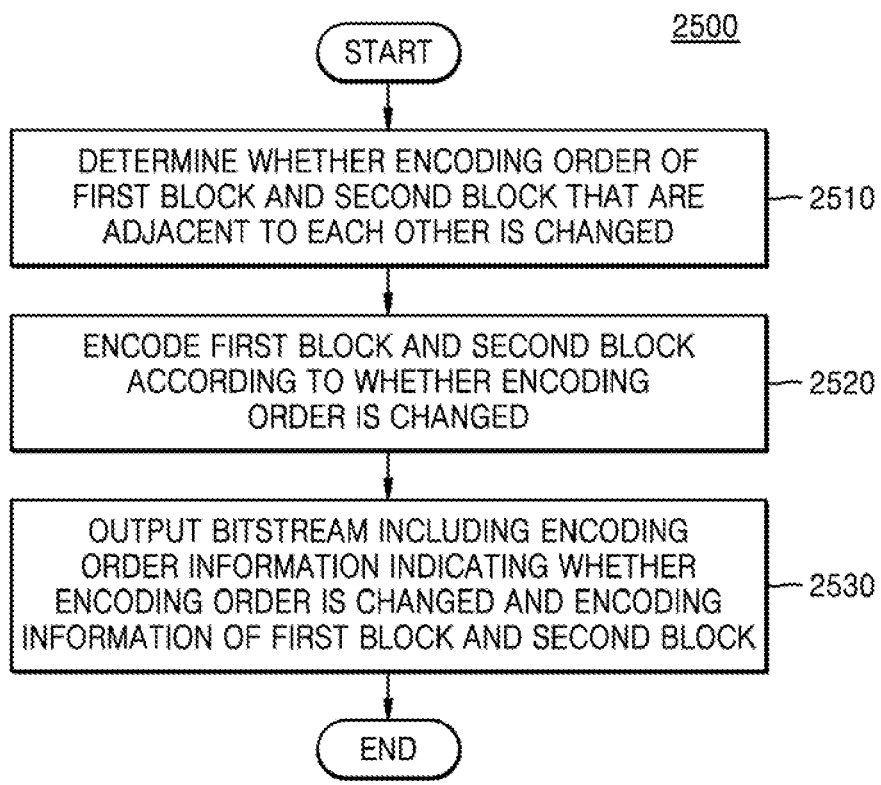

ENCODING SEQUENCE ENCODING METHOD AND DEVICE THEREOF, AND DECODING METHOD AND DEVICE THEREOF

CROSS REFERENCE TO RELATED APPLICATIONS

This application claims benefit of priority under 37 U.S.C. § 1.119(e) to U.S. Provisional Patent Application No. 62/259,374 filed on Nov. 24, 2015, the contents of which are incorporated by reference herein.

TECHNICAL FIELD

The present disclosure relates to methods of encoding and decoding a video, and more particularly, to an intra or inter prediction technique for methods and apparatuses for determining encoding and decoding orders regarding an image.

BACKGROUND ART

When a video of high quality is encoded, a large amount of data is required. However, since a bandwidth allowed for transmission of the video data is limited, a data rate applied to transmission of the video data may be limited. Therefore, for efficient transmission of video data, there is a need for video data encoding and decoding methods with minimal deterioration in image quality and increased compression rates.

Video data may be compressed by removing spatial redundancy and temporal redundancy between pixels. Since adjacent pixels generally have a common characteristic, encoding information of a data unit consisting of pixels is transmitted to remove redundancy between the adjacent pixels.

Pixel values of the pixels included in the data unit are not directly transmitted but information regarding a method of obtaining the pixel values is transmitted. A prediction method of predicting a pixel value that is similar to an original value is determined for each data unit, and encoding information regarding the prediction method is transmitted from an encoder to a decoder. Since a prediction value is not completely equal to the original value, residual data of a difference between the original value and the prediction value is transmitted from the encoder to the decoder.

When prediction is exact, a data amount of the encoding information for specifying the prediction method is increased but a size of the residual data is decreased. Therefore, the prediction method is determined by taking into account sizes of the encoding information and the residual data. In particular, a data unit that is split from a picture has various sizes, and in this regard, when a size of the data unit is increased, there is an increased probability that accuracy of prediction is decreased, whereas a data amount of encoding information is decreased. Thus, a size of a block is determined according to characteristics of a picture.

The prediction method includes intra prediction and inter prediction. The intra prediction involves predicting pixels of a block from adjacent pixels of the block. The inter prediction involves predicting pixels by referring to pixels of a different picture referred to by a picture including the block. Therefore, spatial redundancy is removed through the intra prediction, and temporal redundancy is removed through the inter prediction.

When the number of prediction methods is increased, an amount of encoding information for indicating the prediction method is increased. Thus, when the encoding information to be applied to a block is predicted from a different block, the amount of the encoding information may be decreased.

Since loss of video data is allowed to the extent that the human eye cannot recognize the loss, residual data may be lossy-compressed according to transformation and quantization processes, and by doing so, an amount of the residual data may be decreased.

DESCRIPTION OF EMBODIMENTS

Technical Problem

Provided is a video encoding method of encoding a video by determining an optimal encoding order of blocks. Provided is a video decoding method of decoding the video according to the determined encoding order. Provided is a computer-readable recording medium having recorded thereon a program for executing the video encoding method and the video decoding method, by using a computer.

Solution to Problem

Provided is a video decoding method including obtaining encoding order information indicating whether an encoding order of a first block and a second block that are adjacent to each other is changed; determining the encoding order of the first block and the second block, based on the encoding order information; and decoding the first block and the second block, according to the determined encoding order.

Provided is a video encoding method including determining whether an encoding order of a first block and a second block that are adjacent to each other is changed; encoding the first block and the second block according to whether the encoding order is changed; and outputting a bitstream including encoding order information indicating whether the encoding order is changed and encoding information of the first block and the second block.

Provided is a video decoding apparatus including an encoding order information obtainer configured to obtain encoding order information indicating whether an encoding order of a first block and a second block that are adjacent to each other is changed; an encoding order determiner configured to determine the encoding order of the first block and the second block, based on the encoding order information; and a decoder configured to decode the first block and the second block, according to the determined encoding order.

Provided is a video encoding apparatus including an encoding order determiner configured to determine whether an encoding order of a first block and a second block that are adjacent to each other is changed; an encoder configured to encode the first block and the second block according to whether the encoding order is changed; and an output unit configured to output a bitstream including encoding order information indicating whether the encoding order is changed and encoding information of the first block and the second block.

The technical problems of the present disclosure are not limited to the aforementioned technical features, and other unstated technical problems may be inferred from embodiments below.

Advantageous Effects of Disclosure

Prediction efficiency with respect to a block may be improved by adjusting an encoding order of the block. Therefore, efficiency of encoding and decoding a video may be increased.

BRIEF DESCRIPTION OF DRAWINGS

FIG. 3 illustrates a process of determining at least one coding unit when a coding unit having a non-square shape is split, according to an embodiment.

FIG. 12 illustrates a process of determining a depth of a coding unit when a shape and size of the coding unit changes, in a case where a plurality of coding units are determined when the coding unit is recursively split, according to an embodiment.

FIGS. 22A to 22E illustrate an intra prediction method to be performed on a current block when a right block of the current block is reconstructed by changing an encoding order of blocks.

FIG. 23 illustrates reference blocks to be used when a block is predicted according to an inter mode.

FIG. 24 illustrates a video decoding method performed by the video decoding apparatus, according to an embodiment.

FIG. 25 illustrates a video encoding method performed by the video encoding apparatus, according to an embodiment.

BEST MODE

Figure 1A:
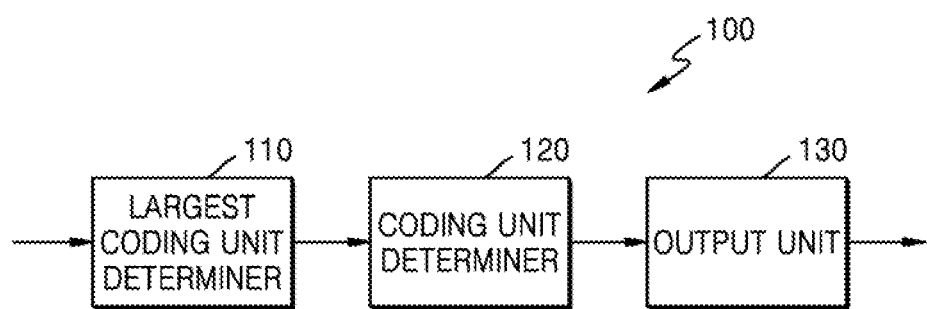
FIG. 1A illustrates a block diagram of an image encoding apparatus based on coding units according to a tree structure, according to an embodiment of the present disclosure.

Provided is a video decoding method including obtaining encoding order information indicating whether an encoding order of a first block and a second block that are adjacent to each other is changed; determining the encoding order of the first block and the second block, based on the encoding order information; and decoding the first block and the second block, according to the determined encoding order.

MODE OF DISCLOSURE

Advantages and features of one or more embodiments of the present disclosure and methods of accomplishing the same may be understood more readily by reference to the following detailed description of the embodiments and the accompanying drawings. In this regard, the present disclosure may, however, be embodied in many different forms and should not be construed as being limited to the embodiments set forth herein. Rather, these embodiments are provided so that this disclosure will be thorough and complete and will fully convey the concept of the present embodiments to one of ordinary skill in the art.

Hereinafter, the terms used in the specification will be briefly defined, and the embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

An expression used in the singular encompasses the expression of the plural, unless it has a clearly different meaning in the context.

When a part "includes" or "comprises" an element, unless there is a particular description contrary thereto, the part can further include other elements, not excluding the other elements. Also, the term "unit" in the embodiments of the present disclosure means a software component or hardware component such as a field-programmable gate array (FPGA) or an application-specific integrated circuit (ASIC), and performs specific functions. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, variables, or the like. A function provided by the components and "units" may be associated with the smaller number of components and "units", or may be divided into additional components and "units"

The term "current block" refers to one of a coding unit, a prediction unit, and a transform unit which are currently to be encoded or decoded. In addition, the term "lower block" refers to a data unit split from the "current block". The term "upper block" refers to a data unit including the "current block".

Hereinafter, a "sample" is data allocated to a sampling location of an image and may mean data that is a processing target. For example, pixel values in an image of a spatial domain or transform coefficients on a transformation domain may be samples. A unit including at least one sample may be defined as a block.

The present disclosure will now be described more fully with reference to the accompanying drawings for one of ordinary skill in the art to be able to perform the present disclosure without any difficulty. In the following description, well-known functions or constructions are not described in detail so as not to obscure the embodiments with unnecessary detail.

FIG. 1A illustrates a block diagram of an image encoding apparatus 100 based on coding units according to a tree structure, according to an embodiment of the present disclosure.

The image encoding apparatus 100 includes a largest coding unit determiner 110, a coding unit determiner 120, and an output unit 130.

The largest coding unit determiner 110 splits a picture or a slice included in the picture into a plurality of largest coding units, according to a size of a largest coding unit. The largest coding unit may be a data unit having a size of 32×32, 64×64, 128×128, 256×256, etc., wherein a shape of the data unit is a square having a width and length in squares of 2. The largest coding unit determiner 110 may provide largest coding unit size information indicating the size of the largest coding unit to the output unit 130. The output unit 130 may include the largest coding unit size information in a bitstream.

The coding unit determiner 120 determines coding units by splitting the largest coding unit. A coding unit may be determined by its largest size and depth. A depth may be defined as the number of times that the coding unit is spatially split from the largest coding unit. When the depth is increased by 1, the coding unit is split into at least two coding units. Therefore, when the depth is increased, sizes of coding units according to depths are each decreased. Whether to split a coding unit is determined according to whether splitting the coding unit is efficient according to rate-distortion optimization. Then, split information indicating whether the coding unit has been split may be generated. The split information may be expressed as a form of a flag.

The coding unit may be split by using various methods. For example, a square coding unit may be split into four square coding units of which width and height are half of those of the square coding unit. The square coding unit may be split into two rectangular coding units of which width is half. The square coding unit may be split into two rectangular coding units of which height is half. The square coding unit may be split into three coding units in a manner that a width or height thereof is split by 1:2:1.

A rectangular coding unit of which width is twice as large as a height may be split into two square coding units. The rectangular coding unit of which width is twice as large as the height may be split into two rectangular coding units of which width is four times larger than a height. The rectangular coding unit of which width is twice as large as the height may be split into two rectangular coding units and one square coding unit in a manner that the width is split by 1:2:1.

Equally, a rectangular coding unit of which height is twice as large as a width may be split into two square coding units. The rectangular coding unit of which height is twice as large as the width may be split into two rectangular coding units of which height is four times larger than a width. Equally, the rectangular coding unit of which height is twice as large as the width may be split into two rectangular coding units and one square coding unit in a manner that the height is split by 1:2:1.

When the image encoding apparatus 100 is capable of using two or more split methods, information regarding a split method that is usable to a coding unit, the split method being from among the split methods that are available to the image encoding apparatus 100, may be determined for each picture. Therefore, only specific split methods may be used for each picture. When the image encoding apparatus 100 uses only one split method, the information regarding a split method that is usable to a coding unit is not separately determined.

When split information of a coding unit indicates that the coding unit is split, split shape information indicating a split method with respect to the coding unit may be generated. When only one split method is usable in a picture including the coding unit, the split shape information may not be generated. When the split method is determined to be adaptive to encoding information adjacent to the coding unit, the split shape information may not be generated.

The largest coding unit may be split to smallest coding units according to smallest coding unit size information. A depth of the largest coding unit may be defined to be an uppermost depth, and a depth of the smallest coding units may be defined to be a lowermost depth. Therefore, a coding unit having an upper depth may include a plurality of coding units having a lower depth.

According to a largest size of a coding unit as described above, image data of a current picture is split into a largest coding unit. The largest coding unit may include coding units that are split according to depths. Since the largest coding unit is split according to the depths, image data of a spatial domain included in the largest coding unit may be hierarchically split according to the depths.

A maximum depth that limits the maximum number of hierarchically splitting the largest coding unit or a minimum size of a coding unit may be preset.

The coding unit determiner 120 compares coding efficiency of hierarchically splitting a coding unit with coding efficiency of not splitting the coding unit. Then, the coding unit determiner 120 determines whether to split the coding unit according to a result of the comparison. When the coding unit determiner 120 determines that splitting the coding unit is more efficient, the coding unit determiner 120 hierarchically splits the coding unit. However, according to the result of the comparison, when the coding unit determiner 120 determines that not splitting the coding unit is more efficient, the coding unit determiner 120 does not split the coding unit. Whether to split the coding unit may be independently determined from whether a neighboring different coding unit is split.

According to an embodiment, whether to split the coding unit may be determined from a coding unit having a large depth, during an encoding procedure. For example, coding efficiency of a coding unit having a maximum depth is compared with coding efficiency of a coding unit having a depth that is less than the maximum depth by 1, and it is determined which one of coding units having the maximum depth and coding units having the depth that is less than the maximum depth by 1 is efficiently encoded in each area of a largest coding unit. According to a result of the determination, whether to split the coding units having the depth that is less than the maximum depth by 1 is determined in each area of the largest coding unit. Afterward, it is determined which one of coding units having a depth that is less than the maximum depth by 2 and one of the coding units having the maximum depth and the coding units having the depth that is less than the maximum depth by 1, the one having been selected according to the result of the determination, are further efficiently encoded in each area of the largest coding unit. The same determination process is performed on each of coding units having a smaller depth, and finally, whether to split the largest coding unit is determined according to which one of the largest coding unit and a hierarchical structure generated by hierarchically splitting the largest coding unit is further efficiently encoded.

Whether to split the coding unit may be determined from a coding unit having a small depth, during the encoding procedure. For example, coding efficiency of the largest coding unit is compared with coding efficiency of a coding unit of which depth is greater than the largest coding unit by 1, and it is determined which one of the largest coding unit and coding units of which depth is greater than the largest coding unit by 1 is efficiently encoded. When the coding efficiency of the largest coding unit is better, the largest coding unit is not split. When coding efficiency of the coding units of which depth is greater than the largest coding unit by 1 is better, the largest coding unit is split, and the comparison process is equally applied to split coding units.

When coding efficiency is examined from a coding unit having a large depth, calculation is large but a tree structure having high coding efficiency is obtained. On the contrary, when the coding efficiency is examined from a coding unit having a small depth, calculation is small but a tree structure having low coding efficiency is obtained. Therefore, in consideration of coding efficiency and calculation, an algorithm for obtaining a hierarchical tree structure of a largest coding unit may be designed by using various methods.

To determine efficiency of a coding unit according to each depth, the coding unit determiner 120 determines prediction and transformation methods that are most efficient to the coding unit. To determine the most efficient prediction and transformation methods, the coding unit may be split into predetermined data units. A data unit may have one of various shapes according to a method of splitting the coding unit. The method of splitting the coding unit which is performed to determine the data unit may be defined as a partition mode. For example, when a coding unit of 2N×2N (where N is a positive integer) is no longer split, a size of a prediction unit included in the coding unit is 2N×2N. When the coding unit of 2N×2N is split, the size of the prediction unit included in the coding unit may be 2N×N, N×2N, or N×N, according to the partition mode. The partition mode according to the present embodiment may generate symmetrical data units obtained by symmetrically splitting a height or width of the coding unit, data units obtained by asymmetrically splitting the height or width of the coding unit, such as 1:n or n:1, data units obtained by diagonally splitting the coding unit, data units obtained by geometrically splitting the coding unit, partitions having arbitrary shapes, or the like.

The coding unit may be predicted and transformed based on a data unit included in the coding unit. However, according to the present embodiment, a data unit for prediction and a data unit for transformation may be separately determined. The data unit for prediction may be defined as a prediction unit, and the data unit for transformation may be defined as a transform unit. A partition mode applied to the prediction unit and a partition mode applied to the transform unit may be different from each other, and prediction of the prediction unit and transformation of the transform unit may be performed in a parallel and independent manner in the coding unit.

To determine an efficient prediction method, the coding unit may be split into at least one prediction unit. Equally, to determine an efficient transformation method, the coding unit may be split into at least one transform unit. The split into the prediction unit and the split into the transform unit may be independently performed from each other. However, when a reconstructed sample in the coding unit is used in intra prediction, a dependent relation is formed between prediction units or transform units included in the coding unit, so that the split into the prediction unit and the transform unit may affect each other.

The prediction unit included in the coding unit may be predicted through intra prediction or inter prediction. The intra prediction involves predicting prediction-unit samples by using reference samples adjacent to the prediction unit. The inter prediction involves predicting prediction-unit samples by obtaining reference samples from a reference picture that is referred to by a current picture.

For the intra prediction, the coding unit determiner 120 may apply a plurality of intra prediction methods to the prediction unit, thereby selecting the most efficient intra prediction method. The intra prediction method includes directional modes such as a DC mode, a planar mode, a vertical mode, a horizontal mode, or the like.

When a reconstructed sample adjacent to a coding unit is used as a reference sample, the intra prediction may be performed on each prediction unit. However, when a reconstructed sample in the coding unit is used as a reference sample, reconstruction with respect to the reference sample in the coding unit has to precede prediction with respect to the reference sample in the coding unit, so that a prediction order of a prediction unit may depend on a transformation order of a transform unit. Therefore, when the reconstructed sample in the coding unit is used as the reference sample, only an intra prediction method for transform units corresponding to the prediction unit, and actual intra prediction may be performed on each transform unit.

The coding unit determiner 120 may determine an optimal motion vector and reference picture, thereby selecting the most efficient inter prediction method. For inter prediction, the coding unit determiner 120 may determine a plurality of motion vector candidates from a coding unit that is spatially and temporally adjacent to a current coding unit, and may determine, from among them, the most efficient motion vector to be a motion vector. Equally, the coding unit determiner 120 may determine a plurality of reference picture candidates from the coding unit that is spatially and temporally adjacent to the current coding unit, and may determine the most efficient reference picture from among them. In another embodiment, the reference picture may be determined from reference picture lists that are predetermined with respect to a current picture. In another embodiment, for accuracy of prediction, the most efficient motion vector from among the plurality of motion vector candidates may be determined to be a prediction motion vector, and a motion vector may be determined by compensating for the prediction motion vector. The inter prediction may be performed in parallel on each prediction unit in the coding unit.

The coding unit determiner 120 may reconstruct the coding unit by obtaining only information indicating the motion vector and the reference picture, according to a skip mode. According to the skip mode, all encoding information including a residual signal is skipped, except for the information indicating the motion vector and the reference picture. Since the residual signal is skipped, the skip mode may be used when accuracy of prediction is very high.

A partition mode to be used may be limited according to the prediction method for the prediction unit. For example, only partition modes for a prediction unit having a size of 2N×2N or N×N may be applied to intra prediction, whereas partition modes for a prediction unit having a size of 2N×2N, 2N×N, N×2N, or N×N may be applied to inter prediction. In addition, only a partition mode for a prediction unit having a size of 2N×2N may be applied to a skip mode of the inter prediction. The image encoding apparatus 100 may change a partition mode for each prediction method, according to coding efficiency.

The image encoding apparatus 100 may perform transformation based on a coding unit or a transform unit included in the coding unit. The image encoding apparatus 100 may transform residual data that is a difference value between an original value and a prediction value with respect to pixels included in the coding unit. For example, the image encoding apparatus 100 may perform lossy-compression on the residual data through quantization and discrete cosine transform (DCT)/discrete sine transform (DST). Alternatively, the image encoding apparatus 100 may perform lossless-compression on the residual data without the quantization.

The image encoding apparatus 100 may determine a transform unit that is the most efficient one for quantization and transformation. The transform unit in the coding unit may be recursively split into smaller sized regions in a manner similar to that in which the coding unit is split according to the tree structure, according to an embodiment. Thus, residual data in the coding unit may be split according to the transform unit having the tree structure according to transformation depths. The image encoding apparatus 100 may generate transformation split information regarding splitting the coding unit and the transform unit according to the determined tree structure of the transform unit.

A transformation depth indicating the number of splitting times to reach the transform unit by splitting the height and width of the coding unit may also be set in the image encoding apparatus 100. For example, in a current coding unit of 2N×2N, a transformation depth may be 0 when the size of a transform unit is 2N×2N, may be 1 when the size of the transform unit is N×N, and may be 2 when the size of the transform unit is N/2×N/2. That is, the transform unit according to the tree structure may be set according to the transformation depth.

In conclusion, the coding unit determiner 120 determines a prediction method that is the most efficient one for a current prediction unit and is from among a plurality of intra prediction methods and inter prediction methods. Then, the coding unit determiner 120 determines a prediction unit determination scheme according to coding efficiency according to a prediction result. Equally, the coding unit determiner 120 determines a transform unit determination scheme according to coding efficiency according to a transformation result. According to the most efficient prediction unit and transform unit determination scheme, coding efficiency of a coding unit is finally determined. The coding unit determiner 120 finalizes a hierarchical structure of a largest coding unit, according to coding efficiency of a coding unit according to each depth.

The coding unit determiner 120 may measure coding efficiency of coding units according to depths, prediction efficiency of prediction methods, or the like by using Rate-Distortion Optimization based on Lagrangian multipliers.

The coding unit determiner 120 may generate split information indicating whether to split a coding unit according to each depth according to the determined hierarchical structure of the largest coding unit. Then, the coding unit determiner 120 may generate, for split coding units, partition mode information to be used in determining a prediction unit and transform unit split information to be used in determining a transform unit. In addition, when the coding unit may be split by using at least two split methods, the coding unit determiner 120 may generate both split information and split shape information that indicates a split method. The coding unit determiner 120 may generate information regarding the prediction method and the transformation method that are used in the prediction unit and the transform unit.

The output unit 130 may output, in a bitstream, a plurality of pieces of information generated by the largest coding unit determiner 110 and the coding unit determiner 120 according to the hierarchical structure of the largest coding unit.

A method of determining the coding unit, the prediction unit, and the transform unit according to the tree structure of the largest coding unit will be described below with reference to FIGS. 3 to 12.

Figure 1B:
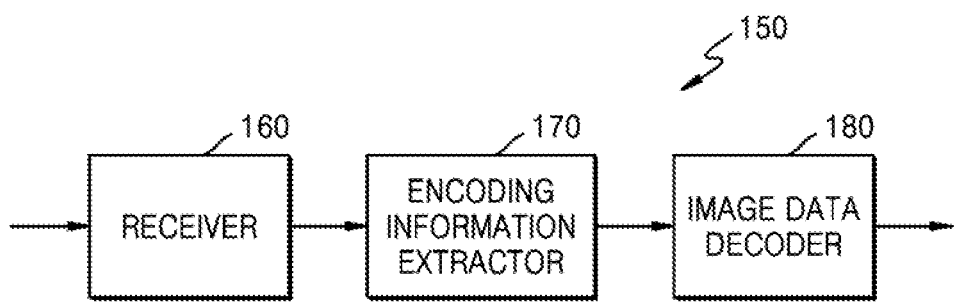
FIG. 1B illustrates a block diagram of an image decoding apparatus based on coding units according to a tree structure, according to an embodiment.

FIG. 1B illustrates a block diagram of an image decoding apparatus 150 based on coding units according to a tree structure, according to an embodiment.

The image decoding apparatus 150 includes a receiver 160, an encoding information extractor 170, and an image data decoder 180.

Definitions of the terms including a coding unit, a depth, a prediction unit, a transform unit, various split information, or the like for a decoding operation performed by the image decoding apparatus 150 are equal to those described above with reference to FIG. 1A and the image encoding apparatus 100. Because the image decoding apparatus 150 is designed to reconstruct image data, various encoding methods used by the image encoding apparatus 100 may also be applied to the image decoding apparatus 150.

The receiver 160 receives and parses a bitstream regarding an encoded video. The encoding information extractor 170 extracts, from the parsed bitstream, a plurality of pieces of information to be used in decoding largest coding units, and provides them to the image data decoder 180. The encoding information extractor 170 may extract information regarding a largest size of a coding unit of a current picture from a header, a sequence parameter set, or a picture parameter set of the current picture.

The encoding information extractor 170 extracts, from the parsed bitstream, a final depth and split information regarding coding units according to a tree structure according to each largest coding unit. The extracted final depth and split information are output to the image data decoder 180. The image data decoder 180 may split a largest coding unit according to the extracted final depth and split information, thereby determining a tree structure of the largest coding unit.

The split information extracted by the encoding information extractor 170 is split information regarding the tree structure determined to generate a minimum encoding error, the determination being performed by the image encoding apparatus 100. Therefore, the image decoding apparatus 150 may reconstruct an image by decoding data according to a decoding scheme that generates the minimum encoding error.

The encoding information extractor 170 may extract split information regarding a data unit such as a prediction unit and a transform unit included in the coding unit. For example, the encoding information extractor 170 may extract partition mode information regarding a partition mode that is the most efficient one for the prediction unit. The encoding information extractor 170 may extract transformation split information regarding a tree structure that is the most efficient one for the transform unit.

The encoding information extractor 170 may obtain information regarding the most efficient prediction method with respect to prediction units split from the coding unit. Then, the encoding information extractor 170 may obtain information regarding the most efficient transformation method with respect to transform units split from the coding unit.

The encoding information extractor 170 extracts the information from the bitstream, according to a method of configuring the bitstream, the method being performed by the output unit 130 of the image encoding apparatus 100.

The image data decoder 180 may split a largest coding unit into coding units having the most efficient tree structure, based on the split information. Then, the image data decoder 180 may split the coding unit into the prediction units according to the partition mode information. The image data decoder 180 may split the coding unit into the transform units according to the transformation split information.

The image data decoder 180 may predict the prediction units according to the information regarding the prediction method. The image data decoder 180 may perform inverse quantization and inverse transformation on residual data that is a difference between an original value and a prediction value of a pixel, according to information regarding a method of transforming a transform unit. The image data decoder 180 may reconstruct pixels of the coding unit, according to a result of the prediction on the prediction units and a result of the transformation on the transform units.

Figure 2:
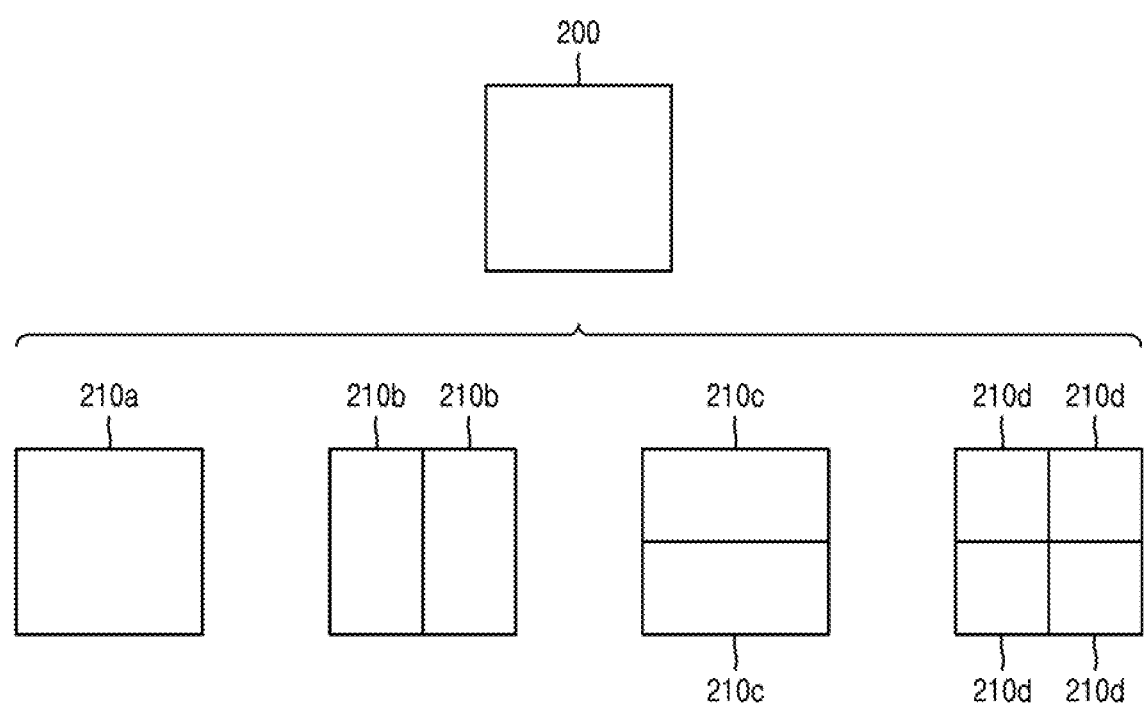
FIG. 2 illustrates a process of determining at least one coding unit when a current coding unit is split, according to an embodiment.

FIG. 2 illustrates a process of determining at least one coding unit when the image decoding apparatus 150 splits a current coding unit, according to an embodiment.

According to the present embodiment, the image decoding apparatus 150 may determine, by using block shape information, a shape of a coding unit, and may determine, by using split shape information, a shape according to which the coding unit is to be split. That is, a method of splitting a coding unit, which is indicated by the split shape information, may be determined based on which block shape is indicated by the block shape information used by the image decoding apparatus 150.

According to the present embodiment, the image decoding apparatus 150 may use the block shape information indicating that a current coding unit has a square shape. For example, the image decoding apparatus 150 may determine whether to split a square coding unit or not, whether to split the square coding unit vertically, whether to split the square coding unit horizontally, or whether to split the square coding unit into four coding units, according to the split shape information. Referring to FIG. 2, when block shape information of a current coding unit 200 indicates a square shape, the image data decoder 180 may not split a coding unit 210*a* having the same size as the current coding unit 200 according to split shape information indicating no split, or may determine coding units 210*b*, 210*c*, and 210*d* split based on split shape information indicating a predetermined split method.

Referring to FIG. 2, the image decoding apparatus 150 may determine the two coding units 210*b* obtained by splitting the current coding unit 200 in a vertical direction based on split shape information indicating split in a vertical direction, according to an embodiment. The image decoding apparatus 150 may determine the two coding units 210*c* obtained by splitting the current coding unit 200 in a horizontal direction based on split shape information indicating split in a horizontal direction. The image decoding apparatus 150 may determine the four coding units 210*d* obtained by splitting the current coding unit 200 in vertical and horizontal directions based on split shape information indicating split in vertical and horizontal directions. However, a split shape for splitting a square coding unit may not be limitedly interpreted to above shapes, and may include various shapes indicatable by split shape information. Predetermined split shapes for splitting a square coding unit will be described in detail below through various embodiments.

FIG. 3 illustrates a process of determining at least one coding unit when the image decoding apparatus 150 splits a coding unit having non-square shape, according to an embodiment.

According to the present embodiment, the image decoding apparatus 150 may use block shape information indicating that a current coding unit has a non-square shape. The image decoding apparatus 150 may determine whether or not to split the current coding unit having the non-square shape, or whether to split the current coding unit having the non-square shape by using a predetermined method. Referring to FIG. 3, when block shape information of a current coding unit 300 or 350 indicates a non-square shape, the image decoding apparatus 150 may not split a coding unit 310 or 360 having the same size as the current coding unit 300 or 350 according to split shape information indicating no split, or may determine coding units 320*a*, 320*b*, 330*a*, 330*b*, 330*c*, 370*a*, 370*b*, 380*a*, 380*b*, and 380*c* split according to split shape information indicating a predetermined split method. A predetermined split method of splitting a non-square coding unit will be described in detail below through various embodiments.

According to the present embodiment, the image decoding apparatus 150 may determine, by using the split shape information, a shape of a coding unit is split, and in this case, the split shape information may indicate the number of at least one coding unit generated when a coding unit is split. Referring to FIG. 3, when the split shape information indicates that the current coding unit 300 or 350 is split into two coding units, the image decoding apparatus 150 may determine the two coding units 320a and 320b or 370a and 370b, which are respectively included in the current coding unit 300 or 350 by splitting the current coding unit 300 or 350 based on the split shape information.

According to the present embodiment, when the image decoding apparatus 150 splits the current coding unit 300 or 350 having the non-square shape based on the split shape information, the image decoding apparatus 150 may split the current coding unit 300 or 350 having the non-square shape in consideration of a location of a longer side. For example, the image decoding apparatus 150 may determine a plurality of coding units by splitting the current coding unit 300 or 350 in a direction of splitting the longer sides of the current coding unit 300 or 350 in consideration of the shape of the current coding unit 300 or 350.

According to the present embodiment, when split shape information indicates that a coding unit is split into an odd number of blocks, the image decoding apparatus 150 may determine an odd number of coding units included in the current coding unit 300 or 350. For example, when split shape information indicates that the current coding unit 300 or 350 is split into three coding units, the image decoding apparatus 150 may split the current coding unit 300 or 350 into the three coding units 330a, 330b, and 330c or 380a, 380b, and 380c. According to the present embodiment, the image decoding apparatus 150 may determine the odd number of coding units included in the current coding unit 300 or 350, wherein sizes of the determined coding units are not the same. For example, a size of the coding unit 330b or 380b from among the odd number of coding units 330a, 330b, and 330c or 380a, 380b, and 380c may be different from sizes of the coding units 330a and 330c or 380a or 380c. That is, coding units that may be determined when the current coding unit 300 or 350 is split may have different types of sizes.

According to the present embodiment, when split shape information indicates that a coding unit is split into an odd number of blocks, the image decoding apparatus 150 may determine an odd number of coding units included in the current coding unit 300 or 350 and in addition, set a predetermined limit on at least one coding unit from among the odd number of coding units generated by splitting the current coding unit 300 or 350. Referring to FIG. 3, the image decoding apparatus 150 may decode the coding unit 330b or 380b at the center of the three coding units 330a, 330b, and 330c or 380a, 380b, and 380c generated when the current coding unit 300 or 350 is split in a different manner from the coding units 330a and 330c or 380a and 380c. For example, the image decoding apparatus 150 may limit the coding unit 330b or 380b at the center not to be further split unlike the coding units 330a and 330c or 380a and 380c, or to be split only a certain number of times.

Figure 4:
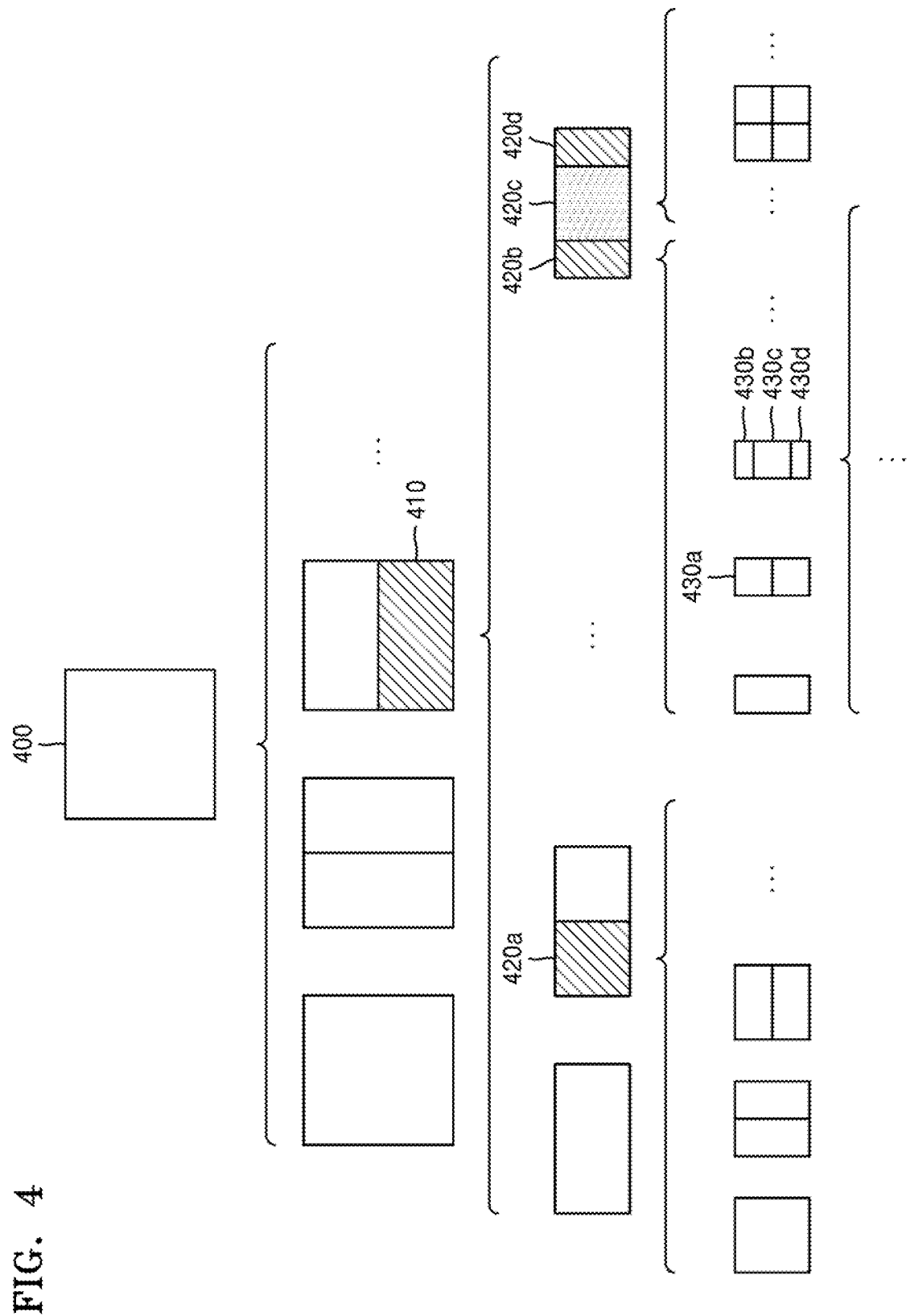
FIG. 4 illustrates a process of splitting a coding unit based on at least one of block shape information and split shape information, according to an embodiment.

FIG. 4 illustrates a process of splitting, by the image decoding apparatus 150, a coding unit based on at least one of block shape information and split shape information, according to an embodiment.

According to the present embodiment, the image decoding apparatus 150 may determine whether to split a first coding unit 400 having a square shape into coding units based on at least one of block shape information and split shape information. According to the present embodiment, when the split shape information indicates splitting of the first coding unit 400 in a horizontal direction, the image decoding apparatus 150 may determine a second coding unit 410 by splitting the first coding unit 400 in the horizontal direction. The terms "first coding unit", "second coding unit", and "third coding unit" according to an embodiment are used in the context of splitting a coding unit. For example, a second coding unit may be determined when a first coding unit is split and a third coding unit may be determined when the second coding unit is split. Relationships between the first through third coding units used hereinafter may be understood to follow the above order characteristics.

According to the present embodiment, the image decoding apparatus 150 may determine whether to split the determined second coding unit 410 into coding units based on at least one of block shape information and split shape information. Referring to FIG. 4, the image decoding apparatus 150 may split the second coding unit 410, which has a non-square shape determined by splitting the first coding unit 400, into at least one third coding unit, for example, third coding units 420a, 420b, 420c, and 420d, based on at least one of block shape information and split shape information, or may not split the second coding unit 410. The image decoding apparatus 150 may obtain at least one of block shape information and split shape information, the image decoding apparatus 150 may split the first coding unit 400 based on at least one of the block shape information and the split shape information to obtain a plurality of second coding units (for example, the second coding unit 410) having various shapes, and the second coding unit 410 may be split according to a manner of splitting the first coding unit 400 based on at least one of the block shape information and the split shape information. According to the present embodiment, when the first coding unit 400 is split into the second coding units 410 based on at least one of block shape information and split shape information about the first coding unit 400, the second coding unit 410 may also be split into the third coding units, for example, the third coding units 420a, 420b, and 420c, 420d, based on at least one of block shape information and split shape information about the second coding unit 410. That is, a coding unit may be recursively split based on at least one of split shape information and block shape information related to the coding unit. A method used to recursively split a coding unit will be described below through various embodiments.

According to the present embodiment, the image decoding apparatus 150 may determine to split each of the third coding units (for example, the third coding units 420a, 420b, 420c, and 420d) into coding units or not to split the second coding unit 410 based on at least one of block shape information and split shape information. The image decoding apparatus 150 may split the second coding unit 410 having a non-square shape into the odd number of third coding units 420b, 420c, and 420d. The image decoding apparatus 150 may set a predetermined limitation on a predetermined third coding unit from among the odd number of third coding units 420b, 420c, and 420d. For example, the image decoding apparatus 150 may limit the coding unit 420c located at the center from among the odd number of third coding units 420b, 420c, and 420d to be split no more or to be split to a settable number of times. Referring to FIG. 4, the image decoding apparatus 150 may limit the coding unit 420c located at the center from among the odd number of third coding units 420b, 420c, and 420d included in the second coding unit 410 having a non-square shape to be split no more, to be split into a predetermined split manner (for example, split only into four coding units or split into a shape corresponding to that into which the second coding unit 410 is split), or to be split only a predetermined number of times (for example, split only n times, wherein n>0). However, the limitations on the coding unit 420c located at the center are simply embodiments, and thus the present disclosure should not be interpreted limitedly to the above embodiments, and it should be interpreted that the limitations include various limitations of decoding the coding unit 420c located at the center differently from the coding units 420b and 420d.

According to the present embodiment, the image decoding apparatus 150 may obtain, from a predetermined location in a current coding unit, at least one of block shape information and split shape information used to split the current coding unit.

Figure 5:
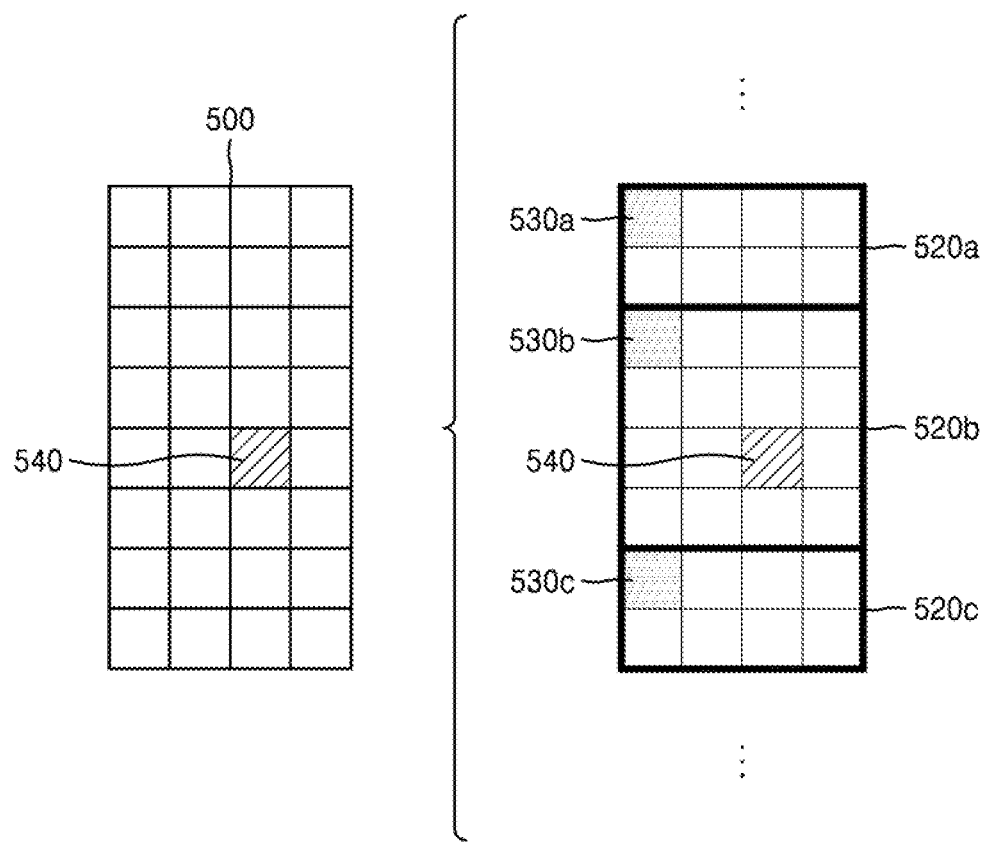
FIG. 5 illustrates a method of determining a predetermined coding unit from among an odd number of coding units, according to an embodiment.

FIG. 5 illustrates a method of determining, by the image decoding apparatus 150, a coding unit at a predetermined location from among an odd number of coding units, according to an embodiment.

According to the present embodiment, the image decoding apparatus 150 may use information indicating a location of each of an odd number of coding units so as to determine a coding unit located at the center of the odd number of coding units. Referring to FIG. 5, the image decoding apparatus 150 may determine an odd number of coding units 520a, 520b, and 520c by splitting a current coding unit 500. The image decoding apparatus 150 may determine the coding unit 520b at the center by using information about locations of the odd number of coding units 520a, 520b, and 520c. For example, the image decoding apparatus 150 may determine the coding unit 520 located at the center by determining locations of the coding units 520a, 520b, and 520c based on information indicating locations of predetermined samples included in the coding units 520a, 520b, and 520c. In detail, the image decoding apparatus 150 may determine the coding unit 520b located at the center by determining the locations of the coding units 520a, 520b, and 520c based on information indicating locations of upper left samples 530a, 530b, and 530c of the coding units 520a, 520b, and 520c.

According to the present embodiment, the information indicating the locations of the upper left samples 530a, 530b, and 530c respectively included in the coding units 520a, 520b, and 520c may include information about locations or coordinates in a picture of the coding units 520a, 520b, and 520c. According to the present embodiment, the information indicating the locations of the upper left samples 530a, 530b, and 530c respectively included in the coding units 520a, 520b, and 520c may include information indicating widths or heights of the coding units 520a, 520b, and 520c included in the current coding unit 500, wherein the widths or heights may correspond to information indicating differences between coordinates in the picture of the coding units 520a, 520b, and 520c. That is, the image decoding apparatus 150 may determine the coding unit 520b located at the center by directly using the information about the locations or coordinates in the picture of the coding units 520a, 520b, and 520c, or by using the information about the widths or heights of the coding units, which indicate difference values between coordinates.

According to the present embodiment, the information indicating the location of the upper left sample 530a of the top coding unit 520a may indicate (xa, ya) coordinates, information indicating the location of the upper left sample 530b of the center coding unit 520b may indicate (xb, yb) coordinates, and the information indicating the location of the upper left sample 530c of the bottom coding unit 520c may indicate (xc, yc) coordinates. The image decoding apparatus 150 may determine the center coding unit 520b by using the coordinates of the upper left samples 530a, 530b, and 530c respectively included in the coding units 520a, 520b, and 520c. For example, when the coordinates of the upper left samples 530a, 530b, and 530c are aligned in an ascending order or descending order, the center coding unit 520b including (xb, yb) that is coordinates of the upper left sample 530b may be determined as a coding unit located at the center from among the coding units 520a, 520b, and 520c determined when the current coding unit 500 is split. Here, the coordinates indicating the locations of the upper left samples 530a, 530b, and 530c may indicate coordinates indicating absolute locations in the picture, and further, may use (dxb, dyb) coordinates that are information indicating a relative location of the upper left sample 530b of the center coding unit 520b and (dxc, dyc) coordinates that are information indicating a relative location of the upper left sample 530c of the bottom coding unit 520c, based on the location of the upper left sample 530c of the top coding unit 520a. Also, a method of determining a coding unit at a predetermined location by using coordinates of a sample included in a coding unit as information indicating a location of the sample should not be limitedly interpreted to the above method, and may be interpreted to various arithmetic methods capable of using coordinates of a sample.

According to the present embodiment, the image decoding apparatus 150 may split the current coding unit 500 into the plurality of coding units 520a, 520b, and 520c, and select a coding unit from among the coding units 520a, 520b, and 520c according to a predetermined criterion. For example, the image decoding apparatus 150 may select the coding unit 520b that has a different size from among the coding units 520a, 520b, and 520c.

According to the present embodiment, the image decoding apparatus 150 may determine the width or height of each of the coding units 520a, 520b, and 520c by using the (xa, ya) coordinates that are the information indicating the location of the upper left sample 530a of the top coding unit 520a, the (xb, yb) coordinates that are the information indicating the location of the upper left sample 530b of the center coding unit 520b, and the (xc, yc) coordinates that are the information indicating the location of the upper left sample 530c of the bottom coding unit 520c. The image decoding apparatus 150 may determine a size of each of the coding units 520a, 520b, and 520c by using the coordinates (xa, ya), (xb, yb), and (xc, yc) indicating the locations of the coding units 520a, 520b, and 520c.

According to an embodiment, the image decoding apparatus 150 may determine the width of the top coding unit 520a to xb-xa and the height to yb-ya. According to the embodiment, the image decoding apparatus 150 may determine the width of the center coding unit 520b to xc-xb and the height to yc-yb. According to the present embodiment, the image decoding apparatus 150 may determine the width or height of the bottom coding unit by using the width or height of the current coding unit, and the width and height of the top coding unit 520a and the center coding unit 520b. The image decoding apparatus 150 may determine one coding unit having a size different from other coding units based on the determined widths and heights of the coding units 520a, 520b, and 520c. Referring to FIG. 5, the image decoding apparatus 150 may determine, as the coding unit at the predetermined location, the center coding unit 520b having a size different from sizes of the top coding unit 520a and the bottom coding unit 520c. However, since a process of determining, by the image decoding apparatus 150, a coding unit having a size different from other coding units is only an embodiment of determining a coding unit at a predetermined location by using sizes of coding units determined based on sample coordinates, various processes of determining a coding unit at a predetermined location by comparing sizes of coding units determined according to predetermined sample coordinates may be used.

However, a location of a sample considered to determine a location of a coding unit should not be limitedly interpreted to the upper left, but may be interpreted that information about a location of an arbitrary sample included in a coding unit is usable.

According to the present embodiment, the image decoding apparatus 150 may select a coding unit at a predetermined location from among an odd number of coding units that are determined when a current coding unit is split, in consideration of a shape of the current coding unit. For example, when the current coding unit has a non-square shape in which a width is longer than a height, the image decoding apparatus 150 may determine the coding unit at the predetermined location along a horizontal direction. In other words, the image decoding apparatus 150 may determine a coding unit from among coding units having different locations in the horizontal direction, and may set a limitation on the coding unit. When the current coding unit has the non-square shape in which the height is longer than the width, the image decoding apparatus 150 may determine the coding unit at the predetermined location along a vertical direction. In other words, the image decoding apparatus 150 may determine a coding unit from among coding units having different locations in the vertical direction, and set a limitation on the coding unit.

According to the present embodiment, the image decoding apparatus 150 may use information indicating a location of each of an even number of coding units so as to determine a coding unit at a predetermined location from among the even number of coding units. The image decoding apparatus 150 may determine the even number of coding units by splitting a current coding unit, and determine the coding unit at the predetermined location by using the information about the locations of the even number of coding units. Detailed processes thereof may correspond to processes of determining a coding unit at a predetermined location (for example, a center location) from among an odd number of coding units, which have been described above with reference to FIG. 5, and thus descriptions thereof are not provided again.

According to the present embodiment, when a current coding unit having a non-square shape is split into a plurality of coding units, predetermined information about a coding unit at a predetermined location may be used during a split process so as to determine the coding unit at the predetermined location from among the plurality of coding units. For example, the image decoding apparatus 150 may use at least one of block shape information and split shape information, which are stored in a sample included in a center coding unit during a split process so as to determine a coding unit located at the center from among a plurality of coding units obtained by splitting a current coding unit.

Referring to FIG. 5, the image decoding apparatus 150 may split the current coding unit 500 into the plurality of coding units 520a, 520b, and 520c based on at least one of block shape information and split shape information, and determine the coding unit 520b located at the center from among the plurality of coding units 520a, 520b, and 520c. In addition, the image decoding apparatus 150 may determine the coding unit 520b located at the center in consideration of a location where at least one of the block shape information and the split shape information is obtained. That is, at least one of the block shape information and the split shape information of the current coding unit 500 may be obtained from the sample 540 located at the center of the current coding unit 500, and when the current coding unit 500 is split into the plurality of coding units 520a, 520b, and 520c based on at least one of the block shape information and the split shape information, the coding unit 520b including the sample 540 may be determined as the coding unit located at the center. However, information used to determine a coding unit located at the center should not be limitedly interpreted to at least one of block shape information and split shape information, and various types of information may be used during a process of determining a coding unit located at the center.

According to the present embodiment, predetermined information for identifying a coding unit at a predetermined location may be obtained from a predetermined sample included in a coding unit to be determined. Referring to FIG. 5, the image decoding apparatus 150 may use at least one of block shape information and split shape information obtained from a sample located at a predetermined location in the current coding unit 500 (for example, a sample located at the center of the current coding unit 500) so as to determine a coding unit at a predetermined location from among the plurality of coding units 520a, 520b, and 520c determined when the current coding unit 500 is split (for example, a coding unit located at the center from among the plurality of coding units). That is, the image decoding apparatus 150 may determine the sample at the predetermined location in consideration of a block shape of the current coding unit 500, and the image decoding apparatus 150 may determine and set a predetermined limitation on the coding unit 520b including the sample from which predetermined location (for example, at least one of the block shape information and the split shape information) is obtained, from among the plurality of coding units 520a, 520b, and 520c determined when the current coding unit 500 is split. Referring to FIG. 5, the image decoding apparatus 150 may determine the sample 540 located at the center of the current coding unit 500, as the sample from which the predetermined information is obtained, and the image decoding apparatus 150 may set the predetermined location during a decoding process, on the coding unit 520b including the sample 540. However, a location of a sample from which predetermined information is obtained should not be limitedly interpreted to the above location, and the sample may be interpreted to samples at arbitrary locations included in the coding unit 520 determined to be limited.

According to the present embodiment, a location of a sample from which predetermined location is obtained may be determined based on a shape of the current coding unit 500. According to the present embodiment, block shape information may be used to determine whether a shape of a current coding unit is a square or a non-square, and a location of a sample from which predetermined information is obtained may be determined based on the shape. For example, the image decoding apparatus 150 may determine, as a sample from which predetermined information is obtained, a sample located on a boundary of splitting at least one of a width and a height of a current coding unit into halves by using at least one of information about the width of the current coding unit and information about the height of the current coding unit. As another example, when block shape information about a current coding unit indicates a non-square shape, the image decoding apparatus 150 may determine, as a sample from which predetermined information is obtained, one of samples adjacent to a boundary of splitting a longer side of the current coding unit into halves.

According to the present embodiment, when a current coding unit is split into a plurality of coding units, the image decoding apparatus 150 may use at least one of block shape information and split shape information so as to determine a coding unit at a predetermined location from among the plurality of coding units. According to an embodiment, the image decoding apparatus 150 may obtain at least one of the block shape information and the split shape information from a sample at a predetermined location included in the coding unit, and the image decoding apparatus 150 may split the plurality of coding units generated when the current coding unit is split by using at least one of the split shape information and the block shape information obtained from the sample at the predetermined location included in each of the plurality of coding units. In other words, the coding unit may be recursively split by using at least one of the block shape information and the split shape information obtained from the sample at the predetermined location in each coding unit. Since a recursive split process of a coding unit has been described above with reference to FIG. 4, details thereof are not provided again.

According to the present embodiment, the image decoding apparatus 150 may determine at least one coding unit by splitting a current coding unit, and determine an order of decoding the at least one coding unit according to a predetermined block (for example, a current coding unit).

Figure 6:
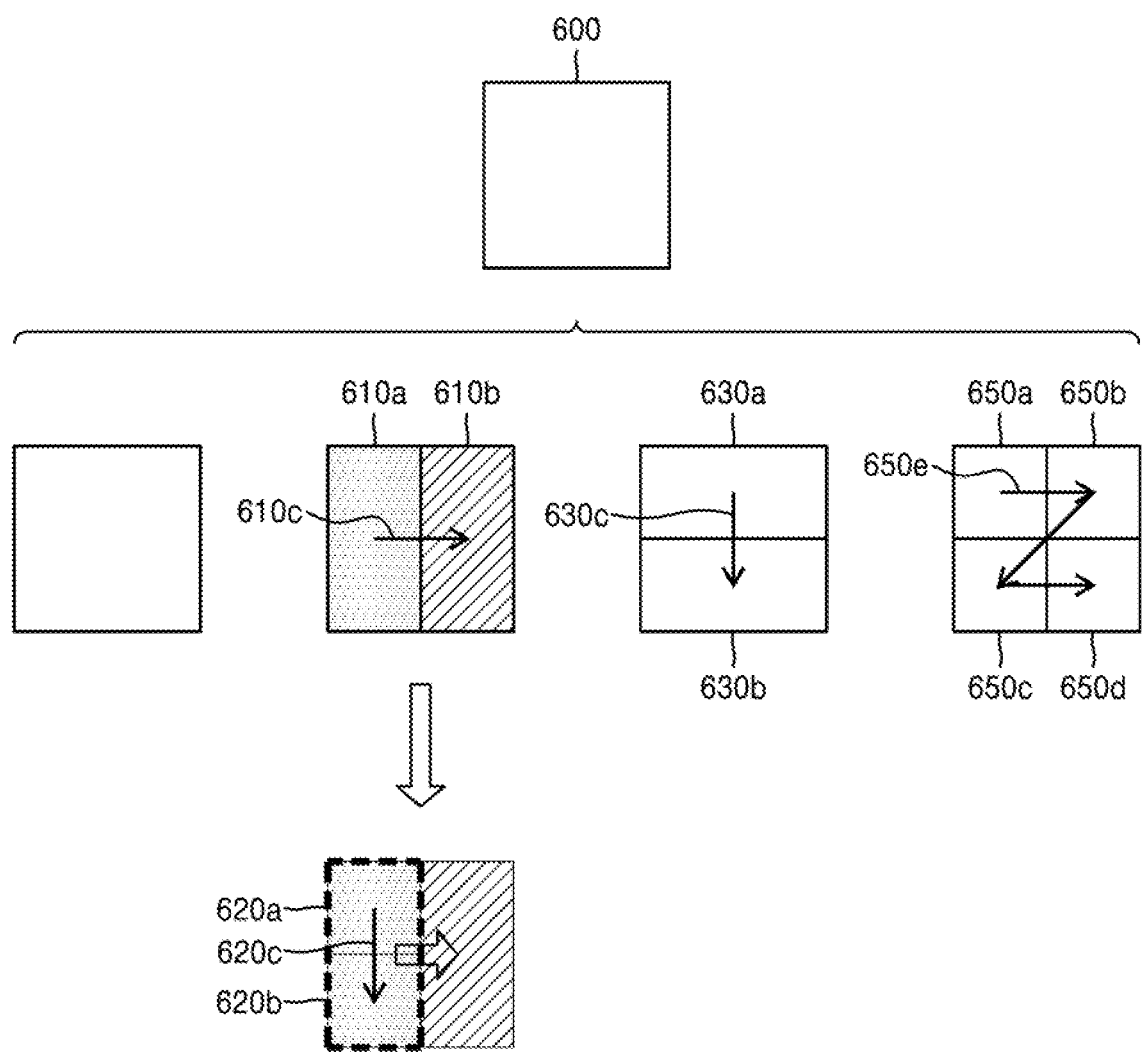
FIG. 6 illustrates an order of processing a plurality of coding units when the plurality of coding units are determined when a current coding unit is split, according to an embodiment.

FIG. 6 illustrates an order of processing a plurality of coding units when the image decoding apparatus 150 determines the plurality of coding units by splitting a current coding unit, according to an embodiment.

According to the present embodiment, the image decoding apparatus 150 may determine, according to block shape information and split shape information, second coding units 610a and 610b by splitting a first coding unit 600 in a vertical direction, second coding units 630a and 630b by splitting the first coding unit 600 in a horizontal direction, or second coding units 650a, 650b, 650c, and 650d by splitting the first coding unit 600 in vertical and horizontal directions.

Referring to FIG. 6, the image decoding apparatus 150 may determine an order such that the second coding units 610a and 610b determined by splitting the first coding unit 600 in the vertical direction to be processed in a horizontal direction 610c. The image decoding apparatus 150 may determine a processing order of the second coding units 630a and 630b determined by splitting the first coding unit 600 in the horizontal direction to be in a vertical direction 630c. The image decoding apparatus 150 may determine the second coding units 650a, 650b, 650c, and 650d determined by splitting the first coding unit 600 in the vertical and horizontal directions to be processed according to a predetermined order (for example, a raster scan order or a z-scan order 650e) in which coding units in one row are processed and then coding units in a next row are processed.

According to the present embodiment, the image decoding apparatus 150 may recursively split coding units. Referring to FIG. 6, the image decoding apparatus 150 may determine a plurality of coding units 610a, 610b, 630a, 630b, 650a, 650b, 650c, and 650d by splitting the first coding unit 600, and may recursively split each of the determined plurality of coding units 610a, 610b, 630a, 630b, 650a, 650b, 650c, and 650d. A method of splitting the plurality of coding units 610a, 610b, 630a, 630b, 650a, 650b, 650c, and 650d may be similar to a method of splitting the first coding unit 600. Accordingly, the plurality of coding units 610a, 610b, 630a, 630b, 650a, 650b, 650c, and 650d may each be independently split into a plurality of coding units. Referring to FIG. 6, the image decoding apparatus 150 may determine the second coding units 610a and 610b by splitting the first coding unit 600 in the vertical direction, and in addition, may determine to split or not to split each of the second coding units 610a and 610b independently.

According to the present embodiment, the image decoding apparatus 150 may split the left second coding unit 610a in the horizontal direction to obtain third coding units 620a and 620b, and may not split the right second coding unit 610b.

According to the present embodiment, a processing order of coding units may be determined based on a split process of coding units. In other words, a processing order of split coding units may be determined based on a processing order of coding units just before being split. The image decoding apparatus 150 may determine an order of processing the third coding units 620a and 620b determined when the left second coding unit 610a is split independently from the right second coding unit 610b. Since the third coding units 620a and 620b are determined when the left second coding unit 610a is split in the horizontal direction, the third coding units 620a and 620b may be processed in a vertical direction 620c. Also, since the order of processing the left second coding unit 610a and the right second coding unit 610b is in the horizontal direction 610c, the third coding units 620a and 620b included in the left second coding unit 610a may be processed in the vertical direction 620c and then the right second coding unit 610b may be processed. Because the above descriptions are for describing a process of determining a processing order according to coding units before being split, the process should not be limitedly interpreted to the above embodiments, and various methods of independently processing coding units split and determined in various shapes according to a predetermined order may be used.

Figure 7:
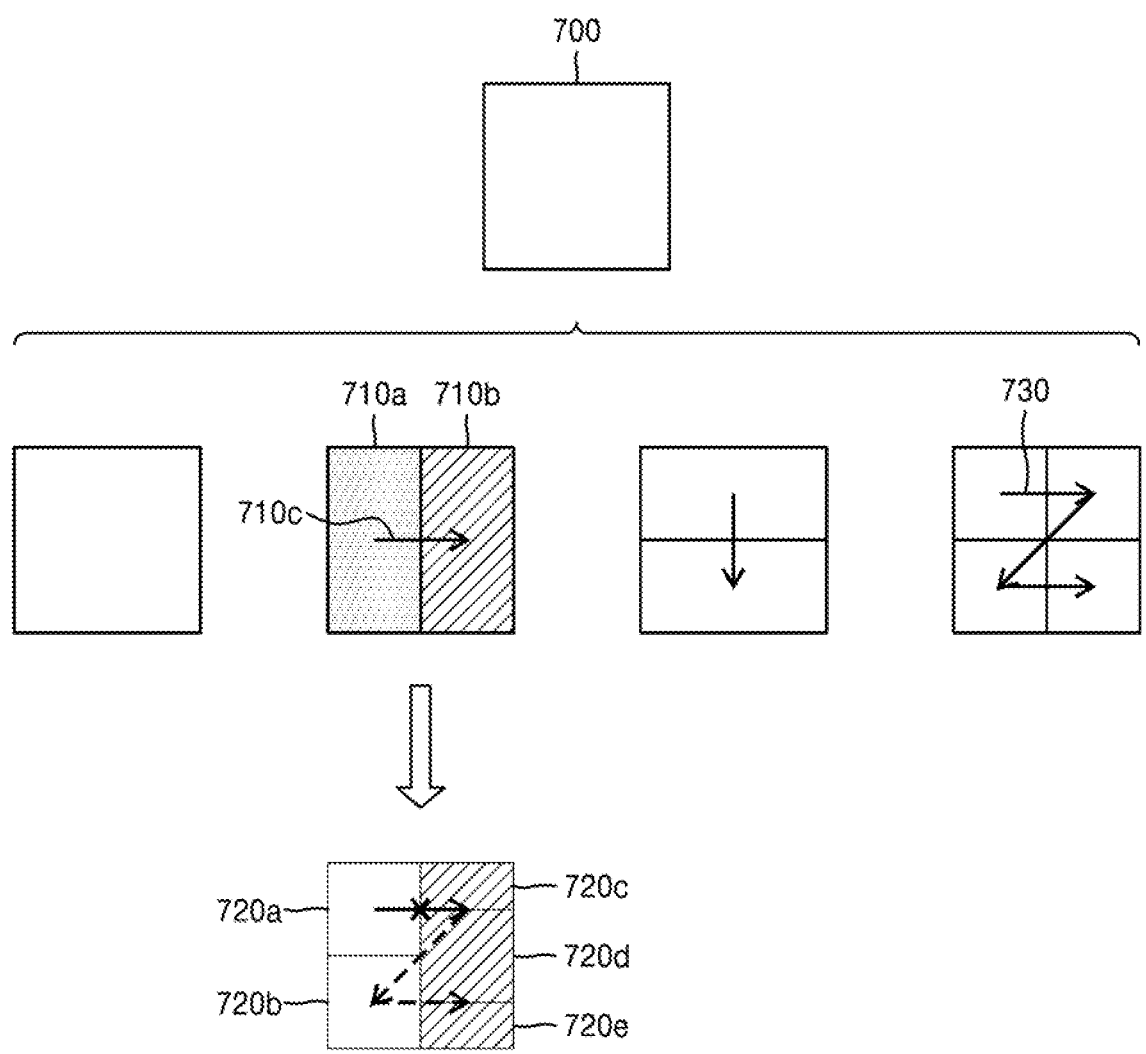
FIG. 7 illustrates a process of determining that a current coding unit is split into an odd number of coding units when coding units are unable to be processed in a predetermined order, according to an embodiment.

FIG. 7 illustrates a process of determining, by the image decoding apparatus 150, that a current coding unit is split into an odd number of coding units when coding units are unable to be processed in a predetermined order, according to an embodiment.

According to the present embodiment, the image decoding apparatus 150 may determine that the current coding unit is split into the odd number of coding units based on obtained block shape information and split shape information. Referring to FIG. 7, a first coding unit 700 having a square shape may be split into second coding units 710a and 710b having non-square shapes, and the second coding units 710a and 710b may be independently split into third coding units 720a, 720b, 720c, 720d, and 720e. According to the present embodiment, the image decoding apparatus 150 may determine a plurality of the third coding units 720a and 720b by splitting the left coding unit 710a from among the second coding units in a horizontal direction, and the right coding unit 710b may be split into an odd number of the third coding units 720c, 720d, and 720e.

According to the present embodiment, the image decoding apparatus 150 may determine whether a coding unit split into an odd number exists by determining whether the third coding units 720a, 720b, 720c, 720d, and 720e are processable in a predetermined order. Referring to FIG. 7, the image decoding apparatus 150 may determine the third coding units 720a, 720b, 720c, 720d, and 720e by recursively splitting the first coding unit 700. The image decoding apparatus 150 may determine, based on at least one of block shape information and split shape information, whether there is a coding unit split into an odd number from among the first coding unit 700, the second coding units 710a and 710b, and the third coding units 720a, 720b, 720c, 720d, and 720e. For example, a coding unit located at the right from among the second coding units 710a and 710b may be split into the odd number of third coding units 720c, 720d, and 720e. An order of processing a plurality of coding units included in the first coding unit 700 may be a predetermined order 730 (for example, a z-scan order), and the image decoding apparatus 150 may determine whether the third coding units 720c, 720d, and 720e determined when the right second coding unit 710b is split into an odd number satisfy a condition of being processable according to the predetermined order.

According to the present embodiment, the image decoding apparatus 150 may determine whether the third coding units 720a, 720b, 720c, 720d, and 720e included in the first coding unit 700 satisfy a condition of being processable according to a predetermined order, wherein the condition is related to whether at least one of a width and a height of the second coding units 710a and 710b is split into halves along boundaries of the third coding units 720a, 720b, 720c, 720d, and 720e. For example, the third coding units 720a and 720b that are determined when the left second coding unit 710a having a non-square shape is split into halves satisfy the condition, but the third coding units 720c, 720d, and 720e do not satisfy the condition since the boundaries of the third coding units 720c, 720d, and 720e that are determined when the right second coding unit 710b is split into three coding units are unable to split a width or height of the right second coding unit 710b into halves. Also, the image decoding apparatus 150 may determine disconnection of a scan order when the condition is dissatisfied, and determine that the right second coding unit 710b is split into an odd number of coding units based on the determination result. According to the present embodiment, when a coding unit is split into an odd number of coding units, the image decoding apparatus 150 may set a predetermined limitation on a coding unit at a predetermined location from among the coding units, and because details about the limitation or the predetermined location have been described above through various embodiments, details thereof are not provided again.

Figure 8:
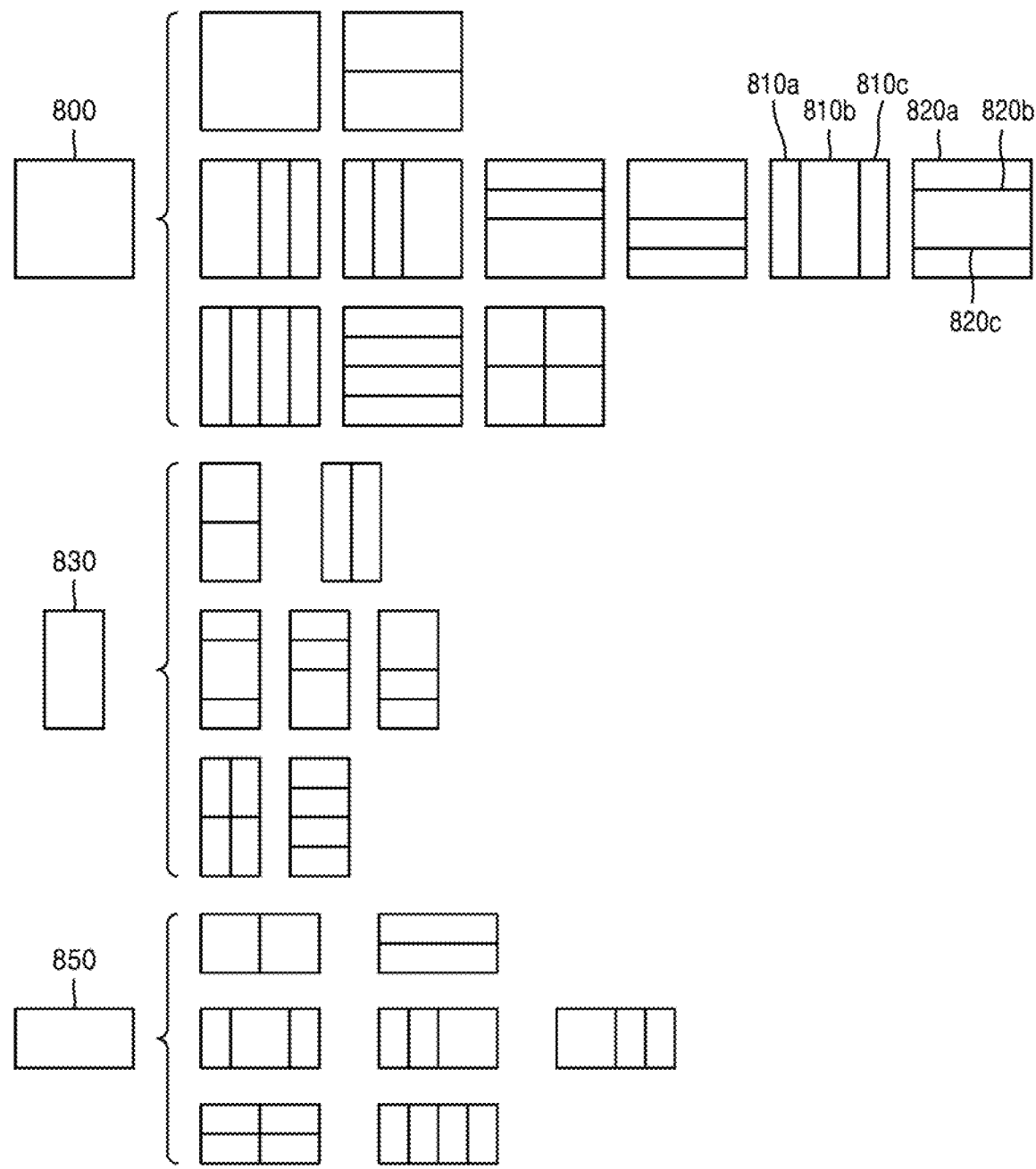
FIG. 8 illustrates a process of determining at least one coding unit when a first coding unit is split, according to an embodiment.

FIG. 8 illustrates a process of determining, by the image decoding apparatus 150, at least one coding unit when a first coding unit 800 is split, according to an embodiment. According to the present embodiment, the image decoding apparatus 150 may split the first coding unit 800 based on at least one of block shape information and split shape information obtained through the receiver 160. The first coding unit 800 having a square shape may be split into four coding units having square shapes or non-square shapes. For example, referring to FIG. 8, when block shape information indicates that the first coding unit 800 is a square and split shape information indicates that the first coding unit 800 is split into non-square coding units, the image decoding apparatus 150 may split the first coding unit 800 into a plurality of non-square coding units. In detail, when the split shape information indicates that the first coding unit 800 is split into a horizontal or vertical direction to determine an odd number of coding units, the image decoding apparatus 150 may split the first coding unit 800 having a square shape into, as the odd number of coding units, second coding units 810a, 810b, and 810c determined when the first coding unit 800 is split in the vertical direction, or second coding units 820a, 820b, and 820c determined when the first coding unit 800 is split in the horizontal direction.

According to the present embodiment, the image decoding apparatus 150 may determine whether the second coding units 810a, 810b, and 810c and 820a, 820b, and 820c included in the first coding unit 800 satisfy a condition of being processable according to a predetermined order, wherein the condition is related to whether at least one of the width and the height of the first coding unit 800 is split into halves along the boundaries of the second coding units 810a, 810b, and 810c and 820a, 820b, and 820c. Referring to FIG. 8, since the boundaries of the second coding units 810a, 810b, and 810c determined when the first coding unit 800 having a square shape is split in the vertical direction are unable to split the width of the first coding unit 800 into halves, it may be determined that the first coding unit 800 does not satisfy the condition of being processable according to the predetermined order. Also, since the boundaries of the second coding units 820a, 820b, and 820c determined when the first coding unit 800 having a square shape is split in the horizontal direction are unable to split the width of the first coding unit 800 into halves, it may be determined that the first coding unit 800 does not satisfy the condition of being processable according to the predetermined order. When the condition is dissatisfied, the image decoding apparatus 150 determines disconnection of a scan order and may determine that the first coding unit 800 is split into an odd number of coding units based on the determination result. According to the present embodiment, when a coding unit is split into an odd number of coding units, the image decoding apparatus 150 may set a predetermined limitation on a coding unit at a predetermined location from among the coding units, and since details about the limitation or the predetermined location have been described above through various embodiments, details thereof are not provided again.

According to the present embodiment, the image decoding apparatus 150 may determine coding units having various shapes by splitting a first coding unit.

Referring to FIG. 8, the image decoding apparatus 150 may split the first coding unit 800 having a square shape and a first coding unit 830 or 850 having a non-square shape into coding units having various shapes.

Figure 9:
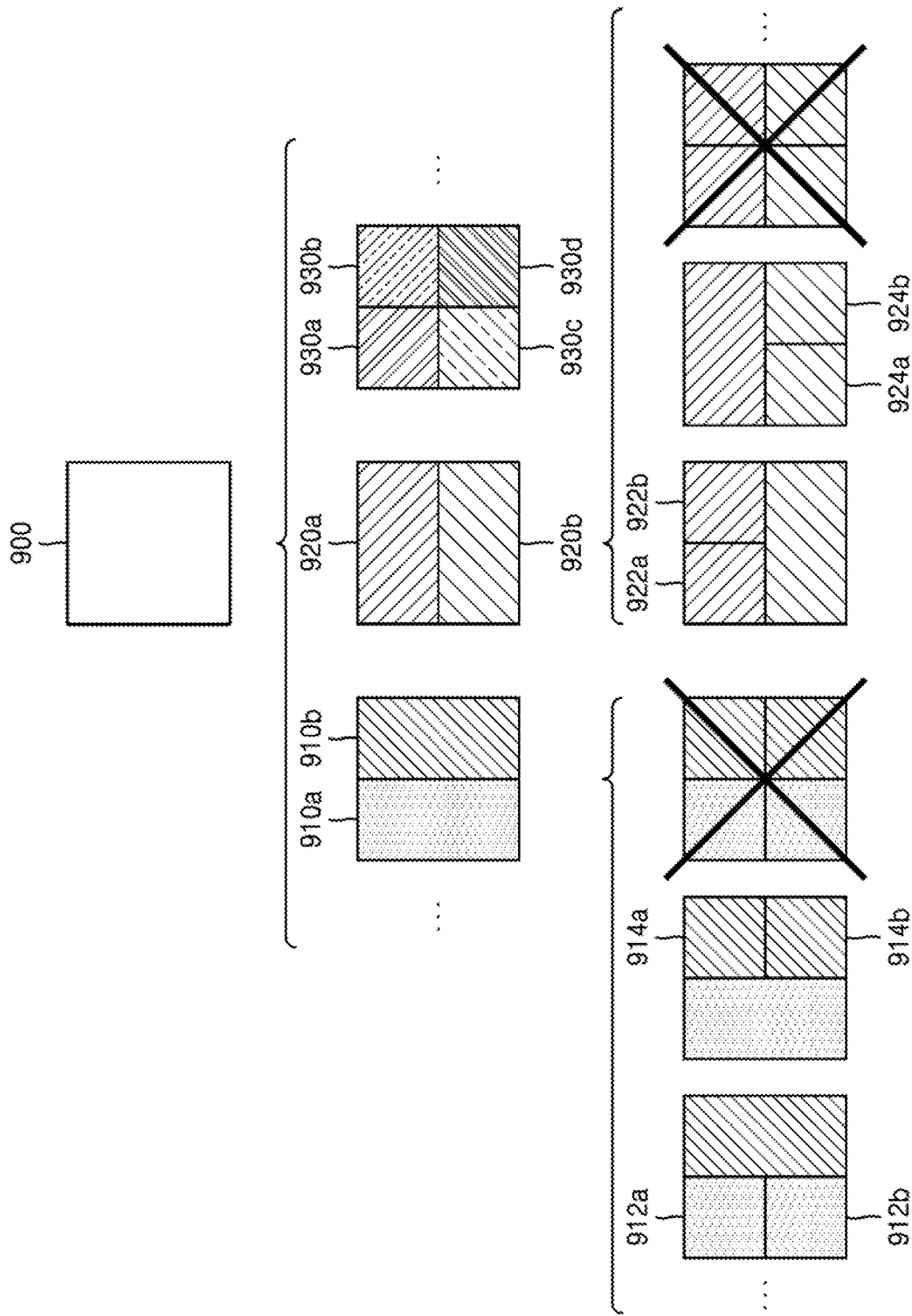
FIG. 9 illustrates that, when a second coding unit having a non-square shape, which is determined when a first coding unit is split, satisfies a predetermined condition, a shape of the second coding unit that is splittable is limited, according to an embodiment.

FIG. 9 illustrates that, when a second coding unit having a non-square shape, which is determined when a first coding unit 900 is split, satisfies a predetermined condition, a shape of the second coding unit that is splittable is limited by the image decoding apparatus 150, according to an embodiment.

According to the present embodiment, the image decoding apparatus 150 may determine, based on at least one of block shape information and split shape information obtained through the receiver 160, to split the first coding unit 900 having a square shape into second coding units 910a, 910b, 920a, and 920b having non-square shapes. The second coding units 910a, 910b, 920a, and 920b may be independently split. Accordingly, the image decoding apparatus 150 may determine to split or not to split the second coding units 910a, 910b, 920a, and 920b based on at least one of block shape information and split shape information related to each of the second coding units 910a, 910b, 920a, and 920b. According to the present embodiment, the image decoding apparatus 150 may determine third coding units 912a and 912b by splitting the left second coding unit 910a having a non-square shape and determined when the first coding unit 900 is split in a vertical direction. However, when the left second coding unit 910a is split in a horizontal direction, the image decoding apparatus 150 may limit the right second coding unit 910b not to be split in the horizontal direction like a direction in which the left second coding unit 910a is split. When the right second coding unit 910b is split in the same direction and third coding units 914a and 914b are determined, the third coding units 912a, 912b, 914a, and 914b may be determined when the left second coding unit 910a and the right second coding unit 910b are independently split in the horizontal direction. However, this is the same result as the image decoding apparatus 150 splitting the first coding unit 900 into four second coding units 930a, 930b, 930c, and 930d having square shapes based on at least one of block shape information and split shape information, and thus may be inefficient in terms of image decoding.

According to the present embodiment, the image decoding apparatus 150 may determine third coding units 922a, 922b, 924a, and 924b by splitting the second coding units 920a or 920b having a non-square shape and determined when the first coding unit 900 is split in the horizontal direction. However, when one of second coding units (for example, the top second coding unit 920a) is split in the vertical direction, the image decoding apparatus 150 may limit the other second coding unit (for example, the bottom second coding unit 920b) not to be split in the vertical direction like a direction in which the top second coding unit 920a is split based on the above reasons.

Figure 10:
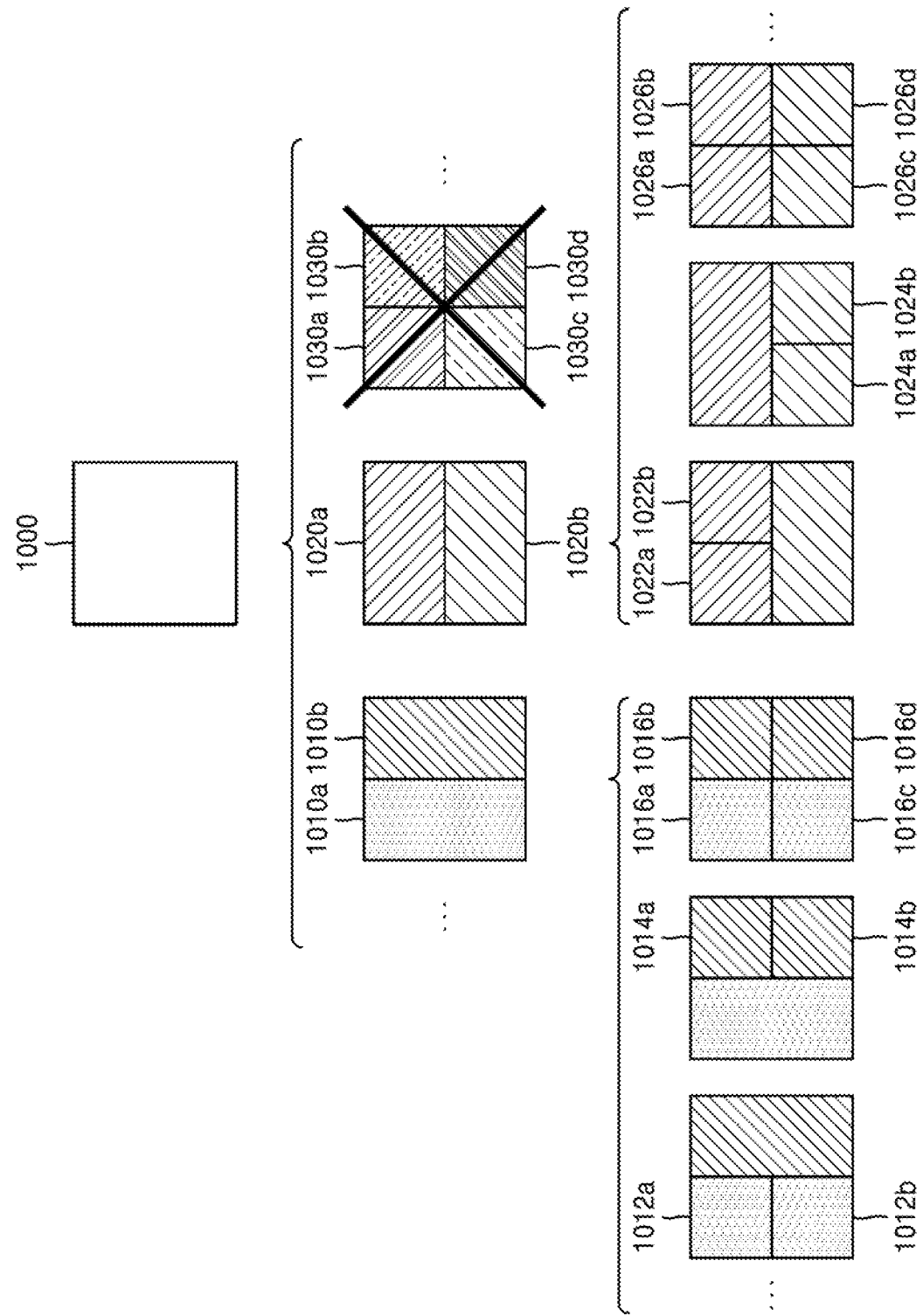
FIG. 10 illustrates a process of splitting a coding unit having a square shape when split shape information does not indicate splitting of the coding unit into four coding units having square shapes, according to an embodiment.

FIG. 10 illustrates a process of splitting, by the image decoding apparatus 150, a coding unit having a square shape when split shape information does not indicate splitting of the coding unit into four coding units having square shapes, according to an embodiment.

According to the present embodiment, the image decoding apparatus 150 may determine second coding units 1010a, 1010b, 1020a, 1020b, and the like by splitting a first coding unit 1000 based on at least one of block shape information and split shape information. The split shape information may include information about various shapes into which a coding unit is splittable, but sometimes, the information about various shapes may not include information for splitting a coding unit into four square coding units. According to such split shape information, the image decoding apparatus 150 is unable to split the first coding unit 1000 having a square shape into four square second coding units 1030a, 1030b, 1030c, and 1030d. Based on the split shape information, the image decoding apparatus 150 may determine the second coding units 1010a, 1010b, 1020a, 1020b, and the like having non-square shapes.

According to the present embodiment, the image decoding apparatus 150 may independently split the second coding units 1010a, 1010b, 1020a, 1020b, and the like having non-square shapes. Each of the second coding units 1010a, 1010b, 1020a, 1020b, and the like may be split in a predetermined order through a recursive method that may correspond to a method of splitting the first coding unit 1000 based on at least one of block shape information and split shape information.

For example, the image decoding apparatus 150 may determine third coding units 1012a and 1012b having square shapes by splitting the left second coding unit 1010a in a horizontal direction and may determine third coding units 1014a and 1014b having square shapes by splitting the right second coding unit 1010b in a horizontal direction. In addition, the image decoding apparatus 150 may determine third coding units 1016a, 1016b, 1016c, and 1016d having square shapes by splitting both the left second coding unit 1010a and the right second coding unit 1010b in the horizontal direction. In this case, coding units may be determined in the same manner in which the first coding unit 1000 is split into the four square second coding units 1030a, 1030b, 1030c, and 1030d.

As another example, the image decoding apparatus 150 may determine third coding units 1022a and 1022b having square shapes by splitting the top second coding unit 1020a in the vertical direction and determine third coding units 1024a and 1024b having square shapes by splitting the bottom second coding unit 1020b in the vertical direction. In addition, the image decoding apparatus 150 may determine third coding units 1022a, 1022b, 1024a, and 1024b having square shapes by splitting both the top second coding unit 1020a and the bottom second coding unit 1020b in the vertical direction. In this case, coding units may be determined in the same manner in which the first coding unit 1000 is split into the four square second coding units 1030a, 1030b, 1030c, and 1030d.

Figure 11:
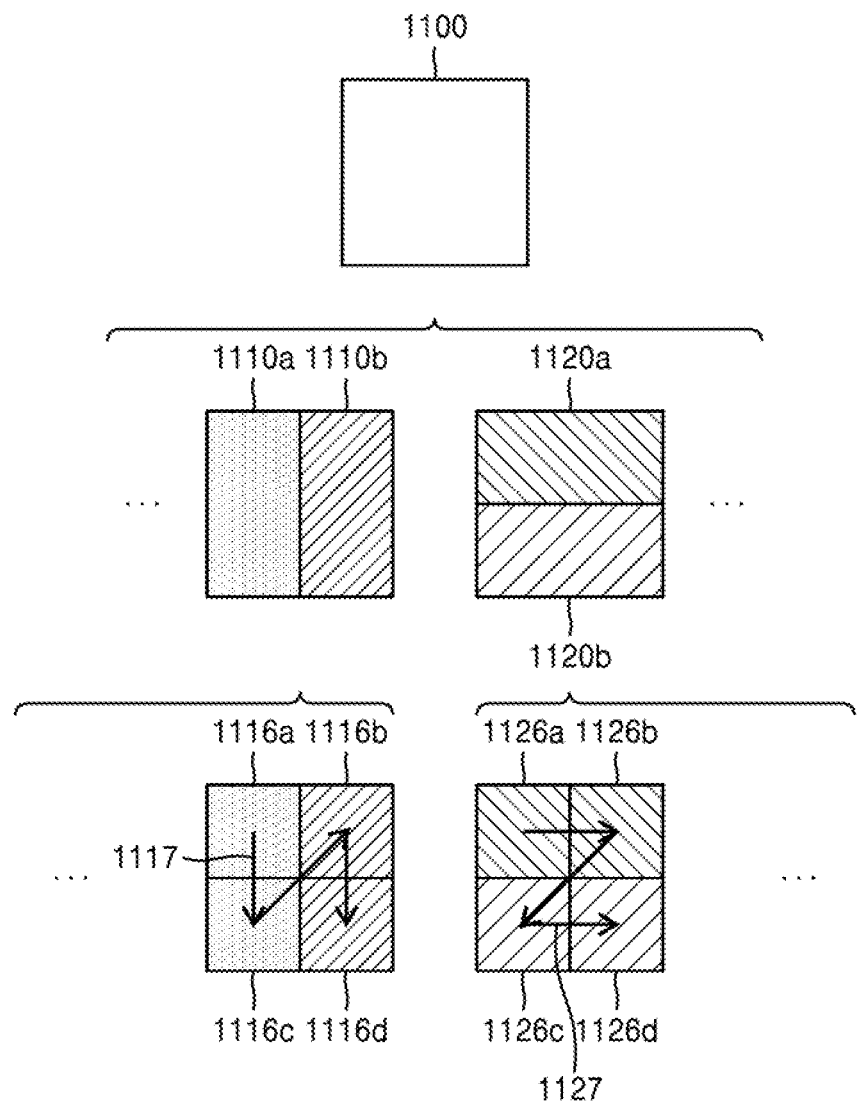
FIG. 11 illustrates that a processing order between a plurality of coding units may be changed according to a split process of a coding unit, according to an embodiment.

FIG. 11 illustrates that a processing order between a plurality of coding units may be changed according to a split process of a coding unit, according to an embodiment.

According to the present embodiment, the image decoding apparatus 150 may split a first coding unit 1100, based on block shape information and split shape information. When the block shape information indicates a square shape and the split shape information indicates that the first coding unit 1100 is split in at least one of a horizontal direction and a vertical direction, the image decoding apparatus 150 may split the first coding unit 1100 to determine second coding units (for example, second coding units 1110a, 1110b, 1120a, 1120b, 1130a, 1130b, 1130c, 1130d, and the like). Referring to FIG. 11, the second coding units 1110a, 1110b, 1120a, and 1120b having non-square shapes and determined when the first coding unit 1100 is split only in the horizontal or vertical direction may each be independently split based on block shape information and split shape information about each of the second coding units 1110a, 1110b, 1120a, and 1120b. For example, the image decoding apparatus 150 may determine third coding units 1116a, 1116b, 1116c, and 1116d by splitting the second coding units 1110a and 1110b in the horizontal direction, wherein the second coding units 1110a and 1110b are generated when the first coding unit 1100 is split in the vertical direction, and may determine third coding units 1126a, 1126b, 1126c, and 1126d by splitting the second coding units 1120a and 1120b in the horizontal direction, wherein the second coding units 1120a and 1120b are generated when the first coding unit 1100 is split in the horizontal direction. Because split processes of the second coding units 1110a, 1110b, 1120a, and 1120b have been described with reference to FIG. 9, details thereof are not provided again.

According to the present embodiment, the image decoding apparatus 150 may process coding units according to a predetermined order. Since characteristics about processing of coding units according to a predetermined order have been described above with reference to FIG. 6, details thereof are not provided again. Referring to FIG. 11, the image decoding apparatus 150 may determine four square third coding units 1116a, 1116b, 1116c, and 1116d or 1126a, 1126b, 1126c, and 1126d by splitting the first coding unit 1100 having a square shape. According to the present embodiment, the image decoding apparatus 150 may determine a processing order of the third coding units 1116a, 1116b, 1116c, and 1116d or 1126a, 1126b, 1126c, and 1126d according to a shape of the first coding unit 1100 being split.

According to the present embodiment, the image decoding apparatus 150 may determine the third coding units 1116a, 1116b, 1116c, and 1116d by splitting each of the second coding units 1110a and 1110b in the horizontal direction, wherein the second coding units 1110a and 1110b are generated when the first coding unit 1100 is split in the vertical direction, and the image decoding apparatus 150 may process the third coding units 1116a, 1116b, 1116c, and 1116d according to an order 1117 of first processing the third coding units 1116a and 1116b included in the left second coding unit 1110a in the vertical direction and then processing the third coding units 1116c and 1116d included in the right second coding unit 1110b in the vertical direction.

According to the present embodiment, the image decoding apparatus 150 may determine the second coding units 1126a, 1126b, 1126c, and 1126d by splitting each of the second coding units 1120a and 1120b in the vertical direction, wherein the second coding units 1120a and 1120b are generated when the first coding unit 1100 is split in the horizontal direction, and the image decoding apparatus 150 may process the third coding units 1126a, 1126b, 1126c, and 1126d according to an order of first processing the third coding units 1126a and 1126b included in the top second coding unit 1120a in the horizontal direction and then processing the third coding units 1126c and 1126d included in the bottom second coding unit 1120b in the horizontal direction.

Referring to FIG. 11, the third coding units 1116a, 1116b, 1116c, 1116d, 1126a, 1126b, 1126c, and 1126d having square shapes may be determined when each of the second coding units 1110a, 1110b, 1120a, and 1120b are split. The second coding units 1110a and 1110b determined when the first coding unit 1100 is split in the vertical direction and the second coding units 1120a and 1120b determined when the first coding unit 1100 is split in the horizontal direction have different shapes, but according to the third coding units 1116a, 1116b, 1116c, 1116d, 1126a, 1126b, 1126c, and 1126d determined thereafter, the first coding unit 1100 is split into coding units having the same shapes. Accordingly, even when coding units having the same shapes are determined as a result by recursively splitting coding units through different processes based on at least one of block shape information and split shape information, the image decoding apparatus 150 may process the coding units having the same shapes in different orders.

FIG. 12 illustrates a process of determining a depth of a coding unit when a shape and size of the coding unit changes, in a case where a plurality of coding units are determined when the coding unit is recursively split, according to an embodiment.

According to the present embodiment, the image decoding apparatus 150 may determine a depth of a coding unit according to a predetermined criterion. For example, the predetermined criterion may be a length of a longer side of the coding unit. When a length of a longer side of a coding unit before being split is 2n times a length of a longer side of a current coding unit, wherein n>0, the image decoding apparatus 150 may determine that a depth of the current coding unit is higher than a depth of the coding unit before being split by n. Hereinafter, a coding unit having a higher depth will be referred to as a coding unit of a lower depth.

Referring to FIG. 12, according to the present embodiment, the image decoding apparatus 150 may determine a second coding unit 1202 and a third coding unit 1204 of lower depths by splitting a first coding unit 1200 having a square shape, based on block shape information indicating a square shape (for example, block shape information may indicate '0: SQUARE'). When a size of the first coding unit 1200 having a square shape is 2N×2N, the second coding unit 1202 determined by splitting a width and a height of the first coding unit 1200 by ½ may have a size of N×N. In addition, the third coding unit 1204 determined by splitting a width and a height of the second coding unit 1202 by ½ may have a size of N/2×N/2. In this case, a width and a height of the third coding unit 1204 correspond to ½ times those of the first coding unit 1200. When a depth of the first coding unit 1200 is D, a depth of the second coding unit 1202, which is ½ times the width and height of the first coding unit 1200, may be D+1, and a depth of the third coding unit 1204, which is ½ times the width and height of the first coding unit 1200, may be D+2.

According to the present embodiment, the image decoding apparatus 150 may determine a second coding unit 1212 or 1222 and a third coding unit 1214 or 1224 of lower depths by splitting a first coding unit 1210 or 1220 having a non-square shape, based on block shape information indicating a non-square shape (for example, the block shape information may indicate '1: NS_VER' indicating that a height is longer than a width or indicate '2: NS_HOR' indicating that a width is longer than a height).

The image decoding apparatus 150 may determine second coding units (for example, the second coding units 1202, 1212, 1222, and the like) by splitting at least one of the width and the height of the first coding unit 1210 having a size of N×2N. In other words, the image decoding apparatus 150 may determine the second coding unit 1202 having a size of N×N or the second coding unit 1222 having a size of N×N/2 by splitting the first coding unit 1210 in a horizontal direction, or may determine the second coding unit 1212 having a size of N/2×N by splitting the first coding unit 1210 in horizontal and vertical directions.

According to the present embodiment, the image decoding apparatus 150 may determine the second coding units (for example, the second coding units 1202, 1212, 1222, and the like) by splitting at least one of the width and the height of the first coding unit 1220 having a size of 2N×N. That is, the image decoding apparatus 150 may determine the second coding unit 1202 having a size of N×N or the second coding unit 1212 having a size of N/2×N by splitting the first coding unit 1220 in the vertical direction, or may determine the second coding unit 1222 having a size of N×N/2 by splitting the first coding unit 1220 in the horizontal and vertical directions.

According to the present embodiment, the image decoding apparatus 150 may determine third coding units (for example, the third coding units 1204, 1214, 1224, and the like) by splitting at least one of a width and a height of the second coding unit 1202 having a size of N×N. That is, the image decoding apparatus 150 may determine the third coding unit 1204 having a size of N/2×N/2, the third coding unit 1214 having a size of N/2×N/2, or the third coding unit 1224 having a size of N/2×N/2 by splitting the second coding unit 1202 in vertical and horizontal directions.

According to the present embodiment, the image decoding apparatus 150 may determine the third coding units (for example, the third coding units 1204, 1214, 1224, and the like) by splitting at least one of a width and a height of the second coding unit 1212 having a size of N/2×N. That is, the image decoding apparatus 150 may determine the third coding unit 1204 having a size of N/2×N/2 or the third coding unit 1224 having a size of N/2×N/2 by splitting the second coding unit 1212 in a horizontal direction, or determine the third coding unit 1214 having a size of N/2×N/2 by splitting the second coding unit 1212 in vertical and horizontal directions.

According to the present embodiment, the image decoding apparatus 150 may determine the third coding units (for example, the third coding units 1204, 1214, 1224, and the like) by splitting at least one of a width and a height of the second coding unit 1214 having a size of N×N/2. That is, the image decoding apparatus 150 may determine the third coding unit 1204 having a size of N/2×N/2 or the third coding unit 1214 having a size of N/2×N/2 by splitting the second coding unit 1212 in a vertical direction, or determine the third coding unit 1224 having a size of N/2×N/2 by splitting the second coding unit 1212 in vertical and horizontal directions.

According to the present embodiment, the image decoding apparatus 150 may split coding units having square shapes (for example, the first coding units 1200, 1202, and 1204) in a horizontal or vertical direction. For example, the first coding unit 1200 having a size of 2N×2N may be split in the vertical direction to determine the first coding unit 1210 having a size of N×2N or in the horizontal direction to determine the first coding unit 1220 having a size of 2N×N/. According to the present embodiment, when a depth is determined based on a length of a longest side of a coding unit, a depth of a coding unit determined when the first coding unit 1200, 1202, or 1204 is split in the horizontal or vertical direction may be the same as a depth of the first coding unit 1200, 1202, or 1204.

According to the present embodiment, the width and height of the third coding unit 1214 or 1224 may be ½ times the first coding unit 1210 or 1220. When the depth of the first coding unit 1210 or 1220 is D, the depth of the second coding unit 1212 or 1214, which is ½ times the width and height of the first coding unit 1210 or 1220, may be D+1, and the depth of the third coding unit 1214 or 1224, which is ½ times the width and height of the first coding unit 1210 or 1220, may be D+2.

Figure 13:
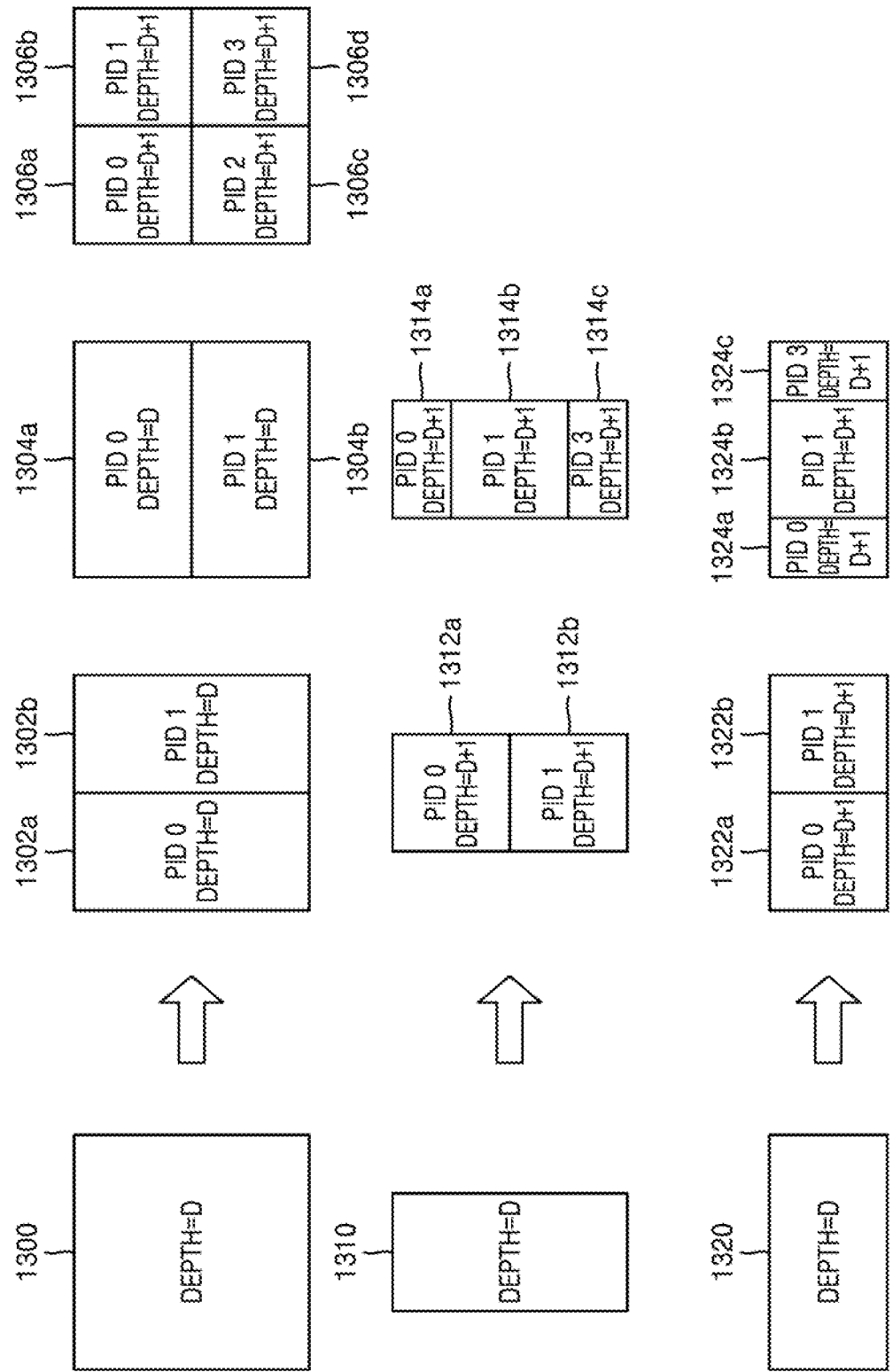
FIG. 13 illustrates a depth determinable according to shapes and sizes of coding units, and a part index (PID) for distinguishing between the coding units, according to an embodiment.

FIG. 13 illustrates a depth determinable according to shapes and sizes of coding units, and a part index (PID) for distinguishing between the coding units, according to an embodiment.

According to the present embodiment, the image decoding apparatus 150 may determine second coding units having various shapes by splitting a first coding unit 1300 having a square shape. Referring to FIG. 13, the image decoding apparatus 150 may determine second coding units 1302a, 1302b, 1304a, 1304b, 1306a, 1306b, 1306c, and 1306d by splitting the first coding unit 1300 in at least one of a vertical direction and a horizontal direction, according to split shape information. That is, the image decoding apparatus 150 may determine the second coding units 1302a, 1302b, 1304a, 1304b, 1306a, 1306b, 1306c, and 1306d based on split shape information about the first coding unit 1300.

According to the present embodiment, depths of the second coding units 1302a, 1302b, 1304a, 1304b, 1306a, 1306b, 1306c, and 1306d determined according to the split shape information about the first coding unit 1300 having a square shape may be determined based on lengths of longer sides. For example, since lengths of longer sides of the second coding units 1302a, 1302b, 1304a, and 1304b having non-square shapes are the same as a length of one side of the first coding unit 1300 having a square shape, depths of the first coding unit 1300 and the second coding units 1302a, 1302b, 1304a, and 1304b having non-square shapes may be D, i.e., the same. On the other hand, when the image decoding apparatus 150 splits the first coding unit 1300 into the four second coding units 1306a, 1306b, 1306c, and 1306d having square shapes based on split shape information, since a length of one side of each of the second coding units 1306a, 1306b, 1306c, and 1306d having square shapes is ½ of a length of one side of the first coding unit 1300, depths of the second coding units 1306a, 1306b, 1306c, and 1306d may be D+1, i.e., one depth lower than the depth D of the first coding unit 1300.

According to the present embodiment, the image decoding apparatus 150 may split a first coding unit 1310 having a height longer than a width into a plurality of second coding units 1312a, 1312b, 1314a, 1314b, and 1314c by splitting the first coding unit 1310 in a horizontal direction according to split shape information. According to the present embodiment, the image decoding apparatus 150 may split a first coding unit 1320 having a width longer than a height into a plurality of second coding units 1322a and 1322b, or 1324a, 1324b, and 1324c by splitting the first coding unit 1320 in a vertical direction according to split shape information.

According to the present embodiment, depths of the second coding units 1312a, 1312b, 1314a, 1314b, 1316a, 1316b, 1316c, and 1316d determined according to the split shape information about the first coding unit 1310 or 1320 having a non-square shape may be determined based on lengths of longer sides. For example, since a length of one side of each of the second coding units 1312a and 1312b having square shapes is ½ of a length of one side of the first coding unit 1310 having a non-square shape in which a height is longer than a width, the depths of the second coding units 1302a, 1302b, 1304a, and 1304b having square shapes are D+1, i.e., one depth lower than the depth D of the first coding unit 1310 having a non-square shape.

In addition, the image decoding apparatus 150 may split the first coding unit 1310 having a non-square shape into an odd number of the second coding units 1314a, 1314b, and 1314c based on split shape information. The odd number of second coding units 1314a, 1314b, and 1314c may include the second coding units 1314a and 1314c having non-square shapes and the second coding unit 1314b having a square shape. Here, since lengths of longer sides of the second coding units 1314a and 1314c having non-square shapes and a length of one side of the second coding unit 1314b having a square shape are ½ of a length of one side of the first coding unit 1310, depths of the second coding units 1314a, 1314b, and 1314c may be D+1, i.e., one depth lower than the depth D of the first coding unit 1310. The image decoding apparatus 150 may determine depths of coding units related to the first coding unit 1310 having a non-square shape in which a width is longer than a height in the similar manner as depths of coding units related to the first coding unit 1310 are determined.

According to the present embodiment, while determining PIDs for distinguishing between coding units, the image decoding apparatus 150 may determine the PIDs based on size ratios between the coding units when an odd number of the coding units do not have the same size. Referring to FIG. 13, the coding unit 1314b located at the center of the odd number of coding units 1314a, 1314b, and 1314c has the same width as the coding units 1314a and 1314c, but has a height twice higher than heights of the coding units 1314a and 1314c. In this case, the coding unit 1314b located at the center may include two of each of the coding units 1314a and 1314c. Accordingly, when a PID of the coding unit 1314b located at the center according to a scan order is 1, a PID of the coding unit 1314c located in a next order may be increased by 2, i.e., 3. That is, values of PIDs may be discontinuous. According to the present embodiment, the image decoding apparatus 150 may determine whether an odd number of coding units have the same size based on discontinuity of PIDs for distinguishing between the coding units.

According to the present embodiment, the image decoding apparatus 150 may determine whether a plurality of coding units determined when a current coding unit is split have certain split shapes based on values of PIDs for distinguishing between the coding units. Referring to FIG. 13, the image decoding apparatus 150 may determine an even number of the coding units 1312a and 1312b or an odd number of the coding units 1314a, 1314b, and 1314c by splitting the first coding unit 1310 having a rectangular shape in which a height is longer than a width. The image decoding apparatus 150 may use an ID indicating each coding unit so as to distinguish between a plurality of coding units. According to the present embodiment, the PID may be obtained from a sample at a predetermined location (for example, an upper left sample) of each coding unit.

According to the present embodiment, the image decoding apparatus 150 may determine a coding unit at a predetermined location from among coding units determined via split, by using PIDs for distinguishing between the coding units. According to an embodiment, when split shape information about the first coding unit 1310 having a rectangular shape in which a height is longer than a width indicates split into three coding units, the image decoding apparatus 150 may split the first coding unit 1310 into the three coding units 1314a, 1314b, and 1314c. The image decoding apparatus 150 may allocate a PID to each of the three coding units 1314a, 1314b, and 1314c. The image decoding apparatus 150 may compare PIDs of coding units so as to determine a center coding unit from among an odd number of coding units. The image decoding apparatus 150 may determine the coding unit 1314b having a PID corresponding to a center value from among PIDs as a coding unit located at the center from among coding units determined when the first coding unit 1310 is split, based on PIDs of the coding units. According to the present embodiment, the image decoding apparatus 150 may determine PIDs based on size ratios between coding units when the coding units do not have the same size, while determining the PIDs for distinguishing between the coding units. Referring to FIG. 13, the coding unit 1314b generated when the first coding unit 1310 is split may have the same width as the coding units 1314a and 1314c, but may have a height twice higher than heights of the coding units 1314a and 1314c. In this case, when the PID of the coding unit 1314b located at the center is 1, the PID of the coding unit 1314c located in a next order may be increased by 2, i.e., 3. As such, when an increase range changes while PIDs are uniformly increasing, the image decoding apparatus 150 may determine that a coding unit is split into a plurality of coding units including a coding unit having a different size from other coding units. According to the present embodiment, when split shape information indicates split into an odd number of coding units, the image decoding apparatus 150 may split a current coding unit into an odd number of coding units in which a coding unit at a predetermined location (for example, a center coding unit) has a different size from other coding units. In this case, the image decoding apparatus 150 may determine the center coding unit having the different size by using PIDs of the coding units. However, since the PID, and a size or location of a coding unit at a predetermined location are specified to describe the present embodiment, and thus the present disclosure is not limited thereto, and various PIDs, and various locations and sizes of a coding unit may be used.

According to the present embodiment, the image decoding apparatus 150 may use a predetermined data unit from which a coding unit starts to be recursively split.

Figure 14:
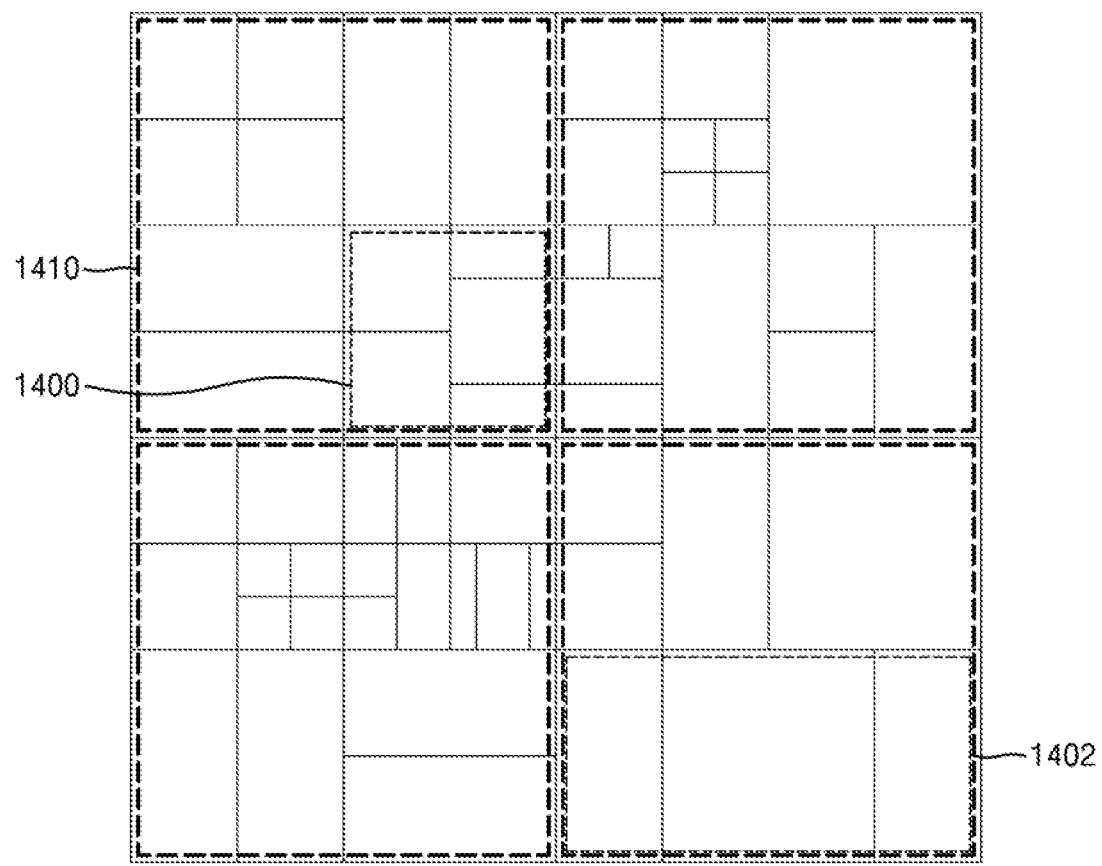
FIG. 14 illustrates that a plurality of coding units are determined according to a plurality of predetermined data units included in a picture, according to an embodiment.

FIG. 14 illustrates that a plurality of coding units are determined according to a plurality of predetermined data units included in a picture, according to an embodiment.

According to the present embodiment, a predetermined data unit may be defined as a data unit from which a coding unit starts to be recursively split by using at least one of block shape information and split shape information. That is, the predetermined data unit may correspond to a coding unit of an uppermost depth used while determining a plurality of coding units splitting a current picture. Hereinafter, for convenience of description, such a predetermined data unit is referred to as a reference data unit.

According to the present embodiment, a reference data unit may indicate a predetermined size and shape. According to an embodiment, a reference coding unit may include M×N samples. Here, M and N may be equal to each other, and may be an integer expressed as a multiple of 2. That is, a reference data unit may indicate a square shape or a non-square shape, and may later be split into an integer number of coding units.

According to the present embodiment, the image decoding apparatus 150 may split a current picture into a plurality of reference data units. According to the present embodiment, the image decoding apparatus 150 may split the plurality of reference data units obtained by splitting the current picture by using split information about each of the reference data units. Split processes of such reference data units may correspond to split processes using a quad-tree structure.

According to the present embodiment, the image decoding apparatus 150 may pre-determine a smallest size available for the reference data unit included in the current picture. Accordingly, the image decoding apparatus 150 may determine the reference data unit having various sizes that are equal to or larger than the smallest size, and determine at least one coding unit based on the determined reference data unit by using block shape information and split shape information.

Referring to FIG. 14, the image decoding apparatus 150 may use a reference coding unit 1400 having a square shape, or may use a reference coding unit 1402 having a non-square shape. According to the present embodiment, a shape and size of a reference coding unit may be determined according to various data units (for example, a sequence, a picture, a slice, a slice segment, and a largest coding unit) that may include at least one reference coding unit.

According to the present embodiment, the receiver 160 of the image decoding apparatus 150 may obtain, from a bitstream, at least one of information about a shape of a reference coding unit and information about a size of the reference coding unit, according to the various data units. Processes of determining at least one coding unit included in the reference coding unit 1400 having a square shape have been described above through processes of splitting the current coding unit 1000 of FIG. 10, and processes of determining at least one coding unit included in the reference coding unit 1402 having a non-square shape have been described above through processes of splitting the current coding unit 1100 or 1150 of FIG. 11, and thus descriptions thereof are not provided here.

According to the present embodiment, to determine a size and shape of a reference coding unit according to some data units pre-determined based on a predetermined condition, the image decoding apparatus 150 may use a PID for checking the size and shape of the reference coding unit. That is, the receiver 160 may obtain, from a bitstream, only a PID for checking a size and shape of a reference coding unit as a data unit satisfying a predetermined condition (for example, a data unit having a size equal to or smaller than a slice) from among various data units (for example, a sequence, a picture, a slice, a slice segment, and a largest coding unit), according to slices, slice segments, and largest coding units. The image decoding apparatus 150 may determine the size and shape of the reference data unit according to data units that satisfy the predetermined condition, by using the PID. When information about a shape of a reference coding unit and information about a size of a reference coding unit are obtained from a bitstream and used according to data units having relatively small sizes, usage efficiency of the bitstream may not be sufficient, and thus instead of directly obtaining the information about the shape of the reference coding unit and the information about the size of the reference coding unit, only a PID may be obtained and used. In this case, at least one of the size and the shape of the reference coding unit corresponding to the PID indicating the size and shape of the reference coding unit may be pre-determined. That is, the image decoding apparatus 150 may select at least one of the pre-determined size and shape of the reference coding unit according to the PID so as to determine at least one of the size and shape of the reference coding unit included in a data unit that is a criterion for obtaining the PID.

According to the present embodiment, the image decoding apparatus 150 may use at least one reference coding unit included in one largest coding unit. That is, a largest coding unit splitting an image may include at least one reference coding unit, and a coding unit may be determined when each of the reference coding unit is recursively split. According to the present embodiment, at least one of a width and height of the largest coding unit may be an integer times at least one of a width and height of the reference coding unit. According to the present embodiment, a size of a reference coding unit may be equal to a size of a largest coding unit, which is split n times according to a quad-tree structure. That is, the image decoding apparatus 150 may determine a reference coding unit by splitting a largest coding unit n times according to a quad-tree structure, and split the reference coding unit based on at least one of block shape information and split shape information according to various embodiments.

Figure 15:
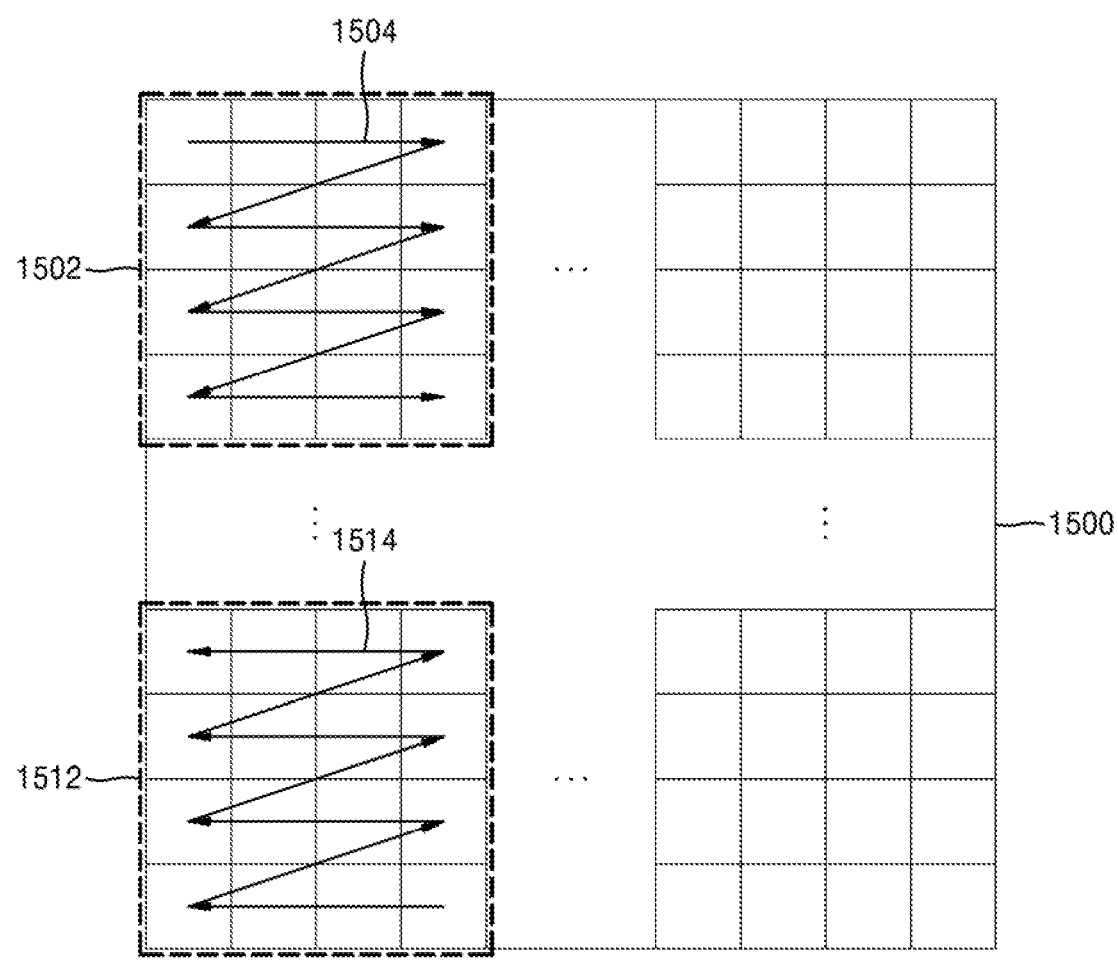
FIG. 15 illustrates a processing block that is a criterion in determining a determining order of a reference coding unit included in a picture, according to an embodiment.

FIG. 15 illustrates a processing block that is a criterion in determining a determining order of a reference coding unit included in a picture 1500, according to an embodiment.

According to the present embodiment, the image decoding apparatus 150 may determine at least one processing block splitting a picture. A processing block is a data unit including at least one reference coding unit splitting an image, and the at least one reference coding unit included in the processing block may be determined in a certain order. That is, a determining order of the at least one reference coding unit determined in each processing block may correspond to one of various orders for determining a reference coding unit, and may vary according to processing blocks. A determining order of a reference coding unit determined per processing block may be one of various orders, such as a raster scan order, a Z-scan order, an N-scan order, an up-right diagonal scan order, a horizontal scan order, and a vertical scan order, but should not be limitedly interpreted by the scan orders.

According to the present embodiment, the image decoding apparatus 150 may determine a size of at least one processing block included in an image by obtaining information about a size of a processing block. The image decoding apparatus 150 may obtain, from a bitstream, the information about a size of a processing block to determine the size of the at least one processing block included in the image. The size of the processing block may be a predetermined size of a data unit indicated by the information about a size of a processing block.

According to the present embodiment, the receiver 160 of the image decoding apparatus 150 may obtain, from the bitstream, the information about a size of a processing block according to certain data units. For example, the information about a size of a processing block may be obtained from the bitstream in data units of images, sequences, pictures, slices, and slice segments. That is, the receiver 160 may obtain, from the bitstream, the information about a size of a processing block according to such several data units, and the image decoding apparatus 150 may determine the size of at least one processing block splitting the picture by using the obtained information about a size of a processing block, wherein the size of the processing block may be an integer times a size of a reference coding unit.

According to the present embodiment, the image decoding apparatus 150 may determine sizes of processing blocks 1502 and 1512 included in the picture 1500. For example, the image decoding apparatus 150 may determine a size of a processing block based on information about a size of a processing block, the information obtained from a bitstream. Referring to FIG. 15, the image decoding apparatus 150 may determine horizontal sizes of the processing blocks 1502 and 1512 to be four times a horizontal size of a reference coding unit, and a vertical size thereof to be four times a vertical size of the reference coding unit, according to an embodiment. The image decoding apparatus 150 may determine a determining order of at least one reference coding unit in at least one processing block.

According to the present embodiment, the image decoding apparatus 150 may determine each of the processing blocks 1502 and 1512 included in the picture 1500 based on a size of a processing block, and may determine a determining order of at least one reference coding unit included in each of the processing blocks 1502 and 1512. According to the present embodiment, determining of a reference coding unit may include determining of a size of the reference coding unit.

According to the present embodiment, the image decoding apparatus 150 may obtain, from a bitstream, information about a determining order of at least one reference coding unit included in at least one processing block, and may determine the determining order of the at least one reference coding unit based on the obtained information. The information about a determining order may be defined as an order or direction of determining reference coding units in a processing block. That is, an order of determining reference coding units may be independently determined per processing block.

According to the present embodiment, the image decoding apparatus 150 may obtain, from a bitstream, information about a determining order of a reference coding unit according to certain data units. For example, the receiver 160 may obtain, from the bitstream, the information about a determining order of a reference coding unit according to data units, such as images, sequences, pictures, slices, slice segments, and processing blocks. Since the information about a determining order of a reference coding unit indicates a determining order of a reference coding unit in a processing block, the information about a determining order may be obtained per certain data unit including an integer number of processing blocks.

According to the present embodiment, the image decoding apparatus 150 may determine at least one reference coding unit based on the determined order.

According to the present embodiment, the receiver 160 may obtain, from the bitstream, information about a determining order of a reference coding unit, as information related to the processing blocks 1502 and 1512, and the image decoding apparatus 150 may determine an order of determining at least one reference coding unit included in the processing blocks 1502 and 1512 and determine at least one reference coding unit included in the picture 1500 according to a determining order of a coding unit. Referring to FIG. 15, the image decoding apparatus 150 may determine determining orders 1504 and 1514 of at least one reference coding unit respectively related to the processing blocks 1502 and 1512. For example, when information about a determining order of a reference coding unit is obtained per processing block, determining orders of a reference coding unit related to the processing blocks 1502 and 1512 may be different from each other. When the determining order 1504 related to the processing block 1502 is a raster scan order, reference coding units included in the processing block 1502 may be determined according to the raster scan order. On the other hand, when the determining order 1514 related to the processing block 1512 is an inverse order of a changed raster scan order, reference coding units included in the processing block 1512 may be determined in the inverse order of the changed raster scan order. With reference to FIGS. 1 to 15, the method of splitting an image into largest coding units, and splitting each largest coding unit into coding units having a hierarchical tree structure are described above. With reference to FIGS. 16 to 25, it will now be described how to encode or decode the encoding units of the same depth according to which encoding order.

Figure 16:
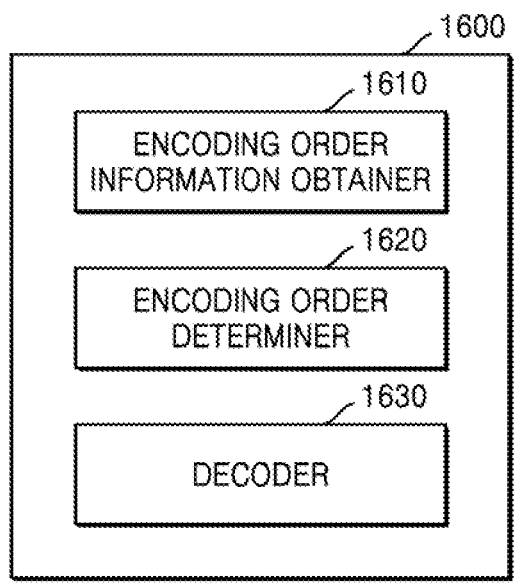
FIG. 16 illustrates a video decoding apparatus involving determining an encoding order of blocks, according to an embodiment.

FIG. 16 illustrates a video decoding apparatus 1600 involving determining an encoding order of blocks, according to an embodiment.

The video decoding apparatus 1600 includes an encoding order information obtainer 1610, an encoding order determiner 1620, and a decoder 1630. Referring to FIG. 16, the encoding order information obtainer 1610, the encoding order determiner 1620, and the decoder 1630 are formed as separate elements, but in another embodiment, the encoding order information obtainer 1610, the encoding order determiner 1620, and the decoder 1630 may be integrated to be implemented as one element.

Referring to FIG. 16, the encoding order information obtainer 1610, the encoding order determiner 1620, and the decoder 1630 are seen as elements located within one apparatus, but the encoding order information obtainer 1610, the encoding order determiner 1620, and the decoder 1630 are not required to be physically adjacent to each other. Thus, in another embodiment, the encoding order information obtainer 1610, the encoding order determiner 1620, and the decoder 1630 may be dispersed.

The encoding order information obtainer 1610, the encoding order determiner 1620, and the decoder 1630 may be implemented by one processor. In another embodiment, the encoding order information obtainer 1610, the encoding order determiner 1620, and the decoder 1630 may be implemented by a plurality of processors.

Functions performed by the encoding order information obtainer 1610, the encoding order determiner 1620, and the decoder 1630 may be performed by the image data decoder 180 of FIG. 1B.

The encoding order information obtainer 1610 obtains encoding order information about an encoding order of neighboring blocks.

Encoding order information indicates information about an encoding order of blocks. The encoding order information may indicate whether to encode at least two blocks according to a default encoding order. When the encoding order of the blocks does not follow the default encoding order, according to the encoding order information, the encoding order of the blocks is changed based on the encoding order information. On the other hand, when the encoding order of the blocks follows the default encoding order, according to the encoding order information, the encoding order of the blocks is changed based on the default encoding order.

A default encoding order indicates an encoding order that is applied to all blocks when there is no encoding order information. The default encoding order may be an encoding order described with reference to FIG. 15 or may be a changed encoding order.

The encoding order information may include an encoding order flag having a 1-bit size which indicates the encoding order of the two blocks. For example, when the encoding order flag indicates 0, the encoding order of the two blocks is determined according to the default encoding order. On the other hand, when the encoding order flag indicates 1, the encoding order of the two blocks is determined to be an inverse order to the default encoding order.

It is determined whether an encoding order of two blocks from among at least three blocks follows the default encoding order, according to one encoding order flag. Thus, an encoding order of the at least three blocks may be determined according to a plurality of encoding order flags.

However, to decrease bits of encoding order information, the encoding order information may include a 1-bit encoding order flag indicating an encoding order of at least three spatially-neighboring blocks. For example, when the encoding order information indicates 0, the encoding order of the at least three blocks is determined according to the default encoding order. On the other hand, when the encoding order information indicates 1, the encoding order of the at least three blocks is determined to be an inverse order to the default encoding order.

The encoding order information obtainer 1610 may obtain the encoding order information from a bitstream. When the bitstream does not include the encoding order information, an encoding order of blocks may be determined according to the default encoding order. When the encoding order information obtainer 1610 internally determines the encoding order, according to an environment around a current block, the encoding order information obtainer 1610 does not obtain the encoding order information from the bitstream.

The encoding order information obtainer 1610 may check encoding order change allowance information with respect to an upper data unit of the current block. The encoding order change allowance information indicates whether a change in an encoding order is allowable for blocks included in the upper data unit of the current block. When the encoding order change allowance information indicates that the change in the encoding order is not allowable, all blocks of the upper data unit are decoded according to a default encoding order. When the encoding order change allowance information indicates that encoding order information with respect to the current block has been encoded, the encoding order information obtainer 1610 may obtain the encoding order information.

In addition, it is possible to determine, based on the encoding order change allowance information, a meaning of a value indicated by an obtained encoding order flag. According to the encoding order change allowance information, it is possible to determine to apply the encoding order flag to two blocks, at least three blocks, or a plurality of blocks based on another predetermined scheme.

The encoding order change allowance information may be included in a video parameter set, a sequence parameter set, a picture parameter set, a slice segment header, a header of a largest coding unit, or the like. When at least two types of the encoding order information are present, two pieces of encoding order change allowance information regarding at least two types of the encoding order information may be separately stored in different headers.

The encoding order determiner 1620 determines an encoding order of blocks, based on the encoding order information.

When the encoding order flag is applied to the two blocks, the encoding order determiner 1620 may determine an encoding order of the two blocks. For example, when the encoding order flag indicates 0 with respect to a first block and a second block that has an encoding order after the first block according to a default encoding order, an encoding order of the first block and the second block is determined according to the default encoding order. However, when the encoding order flag indicates 1, an encoding order of the first block is swapped with an encoding order of the second block, thus, the second block is determined to have an encoding order preceding that of the first block.

When the encoding order flag is applied to at least three blocks, the encoding order determiner 1620 may determine a direction of an encoding order of the at least three blocks. For example, when the encoding order of the at least three blocks according to the default encoding order indicates a first block, a second block, and then a third block, when the encoding order flag indicates 0, the encoding order of the at least three blocks is determined to be the first block, the second block, and then the third block as to the default encoding order. On the other hand, when the encoding order flag indicates 1, the encoding order of the at least three blocks is determined to be the third block, the second block, and then the first block, according to an inverse direction to the default encoding order.

The encoding order determiner 1620 may internally determine the encoding order information according to an environment around the current block. For example, an encoding order of the current block may be determined by referring to an encoding order that was applied to reconstructed neighboring blocks. Also, the encoding order may be determined, according to characteristics of the current block or the reconstructed neighboring blocks.

The decoder 1630 decodes blocks according to a determined encoding order. The methods described with reference to FIGS. 2 to 15 may be applied as a decoding method by the decoder 1630.

Figure 17:
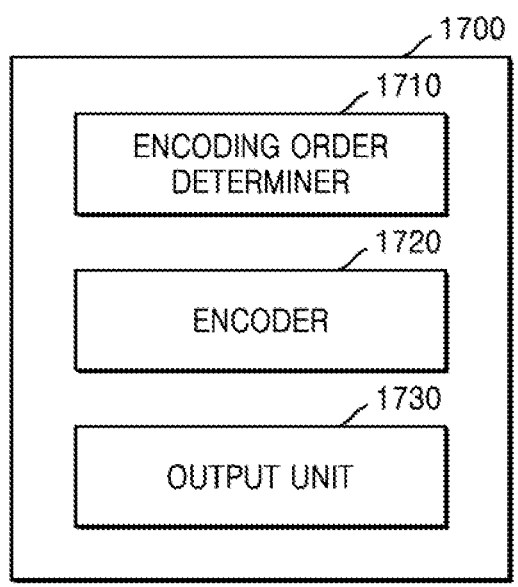
FIG. 17 illustrates a video encoding apparatus involving determining an encoding order of blocks, according to an embodiment.

FIG. 17 illustrates a video encoding apparatus 1700 involving determining an encoding order of blocks, according to an embodiment.

The video encoding apparatus 1700 includes an encoding order determiner 1710, an encoder 1720, and an output unit 1730. Referring to FIG. 17, the encoding order determiner 1710, the encoder 1720, and the output unit 1730 are formed as separate elements, but in another embodiment, the encoding order determiner 1710, the encoder 1720, and the output unit 1730 may be integrated to be implemented as one element.

Referring to FIG. 17, the encoding order determiner 1710, the encoder 1720, and the output unit 1730 are seen as elements located within one apparatus, but the encoding order determiner 1710, the encoder 1720, and the output unit 1730 are not required to be physically adjacent to each other. Thus, in another embodiment, the encoding order determiner 1710, the encoder 1720, and the output unit 1730 may be dispersed.

The encoding order determiner 1710, the encoder 1720, and the output unit 1730 may be implemented by one processor. In another embodiment, the encoding order determiner 1710, the encoder 1720, and the output unit 1730 may be implemented by a plurality of processors.

Functions performed by the encoding order determiner 1710 and the encoder 1720 may be performed by the coding unit determiner 120 of FIG. 1A. In addition, functions performed by the output unit 1730 of FIG. 17 may be performed by the output unit 130 of FIG. 1A.

The encoding order determiner 1710 determines whether to change an encoding order of neighboring blocks. Coding efficiency of blocks based on a default encoding order is compared with coding efficiency of the blocks based on an order changed from the default encoding order, and then whether to change the encoding order may be determined. When the coding efficiency based on the default encoding order is better, an encoding order based on the default encoding order is not changed. On the other hand, when the coding efficiency based on the order changed from the default encoding order is better, the encoding order based on the default encoding order is changed.

The encoding order determiner 1710 may compare coding efficiencies of predetermined encoding orders. For example, whether to determine an encoding order of a two-block unit according to the default encoding order may be determined. As another example, whether to determine an encoding order of a three-block unit according to the default encoding order may be determined.

The encoding order determiner 1710 may internally determine encoding order information, based on an environment around current blocks, according to a predetermined criterion. When an encoding order is internally determined based on the environment around the current blocks, a process of determining encoding order candidates may be omitted. In another embodiment, the encoding order determiner 1710 may determine the encoding order by analyzing neighboring blocks of a current block and a texture of the current block. Because the encoding order is determined according to a similarity of the textures, coding efficiencies of the encoding order candidates are not always calculated. Therefore, calculation efficiency in the encoding process may be increased.

When encoding order change allowance information of the current block indicates that an encoding order change with respect to the current block is allowed, the encoding order determiner 1710 may determine whether to change the encoding order. On the other hand, the encoding order change is not allowed based on the encoding order change allowance information, the encoding order determiner 1710 may determine an encoding order of all blocks, according to the default encoding order.

The encoder 1720 encodes the blocks according to the encoding order determined by the encoding order determiner 1710.

The output unit 1730 outputs a bitstream including encoding order information indicating whether the encoding order of the blocks is changed from the default encoding order. In addition, the output unit 1730 may output an encoding method for the blocks and encoding information about an encoding result.

A block with reference to FIGS. 16 and 17 may indicate a largest coding unit or a coding unit included in the largest coding unit. With reference to FIG. 16, blocks may be sequentially adjacent to each other according to the default encoding order. With reference to FIG. 16, the blocks may be horizontally or vertically adjacent to each other.

Figure 18:
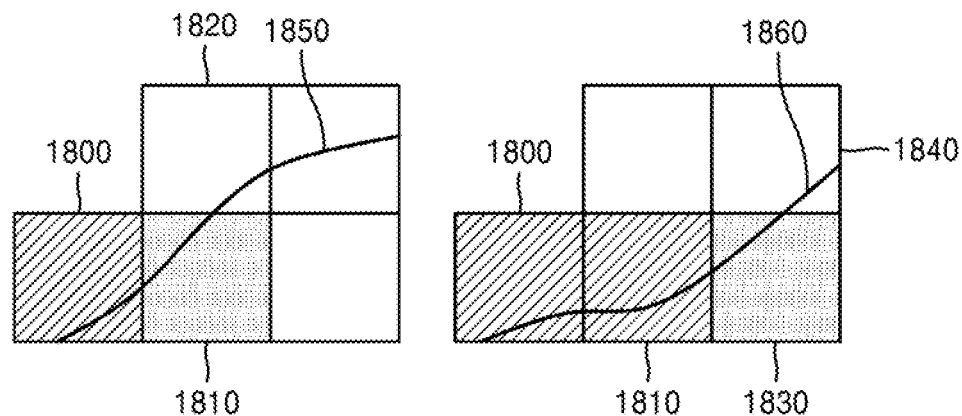
FIG. 18 is a diagram for describing the necessity of changing an encoding order of blocks.

FIG. 18 is a diagram for describing the necessity of changing an encoding order of blocks. A connection line 1850 and a connection line 1860 connect samples having similar characteristics. Thus, during a process of decoding a block 1800, high coding efficiency may be achieved by using encoding information corresponding to samples located at the connection line 1850 and the connection line 1860. The connection line 1850 in an embodiment at the left of FIG. 18 passes through a left boundary and an upper boundary of a block 1810. The connection line 1850 in an embodiment at the right of FIG. 18 passes through the left boundary and a right boundary of the block 1810.

When the block 1800 is reconstructed according to a raster scan order, only left, upper, upper left, and upper right blocks of the block 1800 have been reconstructed. Thus, only encoding information of the left, upper, upper left, and upper right blocks of the block 1800 may be used in decoding the block 1800.

In the embodiment at the left of FIG. 18, the connection line 1850 passes through an upper left block 1820 of the block 1800. Because the upper left block 1820 has been already reconstructed, the block 1800 may be reconstructed based on the upper left block 1820. Thus, it is not necessary for the block 1810 to be reconstructed prior to the block 1800.

However, in the embodiment at the right of FIG. 18, the connection line 1860 does not pass through blocks that have been reconstructed from among neighboring blocks of the block 1800. Thus, unless the block 1810 is priorly reconstructed, the block 1800 cannot be efficiently reconstructed. Thus, it is necessary to change an encoding order of the block 1800 and the block 1810.

Because the connection line 1860 passes through an upper right block 1840 of the block 1810, the block 1810 may be efficiently reconstructed by using encoding information of the upper right block 1840. After the block 1810 is reconstructed, the block 1800 may be reconstructed by using encoding information of the block 1810. Thus, in the embodiment at the right of FIG. 18, it may be more efficient to reconstruct the block 1810 prior to the block 1800.

Figure 19A:
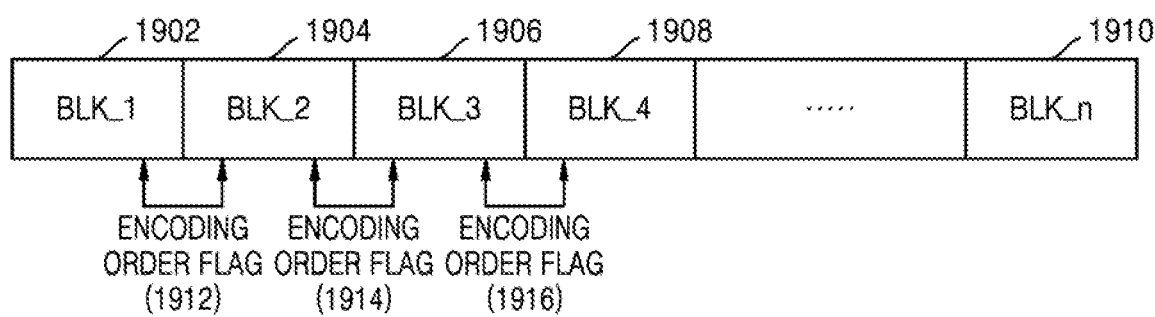
FIGS. 19A and 19B illustrate embodiments of a method of determining an encoding order of blocks.
Figure 19B:
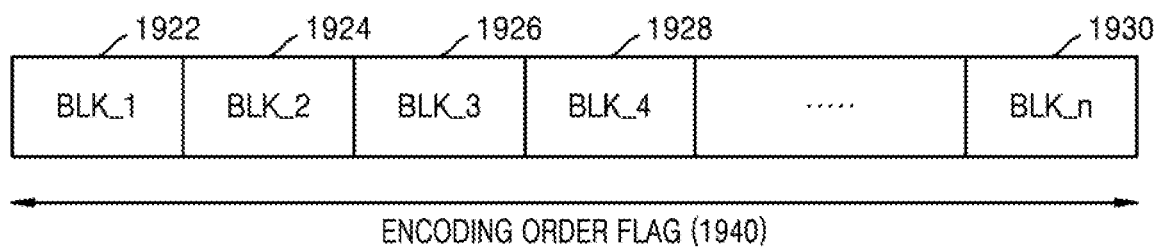

FIGS. 19A and 19B illustrate embodiments of a method of determining an encoding order of blocks. FIG. 19A illustrates the embodiment of using an encoding order flag indicating whether to change an encoding order of two neighboring blocks. FIG. 19B illustrates the embodiment of using an encoding order flag indicating whether a direction of an encoding order of at least three neighboring blocks is changed.

An encoding order flag 1912 of FIG. 19A indicates whether an encoding order of a block 1902 and a block 1904 is changed. When the encoding order flag 1912 indicates 0, the block 1902 has an encoding order preceding the block 1904. On the other hand, when the encoding order flag 1912 indicates 1, the block 1904 has an encoding order preceding the block 1902. Equally, an encoding order flag 1914 determines an encoding order of the block 1904 and a block 1906, and an encoding order flag 1916 determines an encoding order of the block 1906 and a block 1908.

According to another embodiment, when the encoding order flag 1912 indicates 0, the encoding order of the block 1902 and the block 1904 is not changed, and only the block 1902 is reconstructed. Then, the encoding order of the block 1904 and the block 1906 which are adjacent to the reconstructed block 1902 is determined according to the encoding order flag 1914.

When the encoding order flag 1912 indicates 1, the encoding order of the block 1902 and the block 1904 is changed, and the block 1904 and the block 1902 are sequentially reconstructed. Because the block 1904 has been already reconstructed, the encoding order flag 1914 is not obtained but the encoding order flag 1916 is obtained. According to the encoding order flag 1916, an encoding order of the block 1906 and the block 1908 which are adjacent to the block 1904 is determined.

The aforementioned embodiment may be applied to all blocks of a line, regardless of locations and types of the blocks. Thus, until a block 1910 is reconstructed, determination of an encoding order and reconstruction are performed.

An encoding order flag 1940 of FIG. 19B indicates a direction of an encoding order to be applied to all blocks. When the encoding order flag 1940 indicates 0, a block 1922 located at the left is encoded according to a raster scan order. For example, after the block 1922 is reconstructed, a block 1924 may be reconstructed, and after the block 1924 is reconstructed, a block 1926 may be reconstructed.

On the other hand, when the encoding order flag 1940 indicates 1, a block 1930 located at the right is encoded according to an inverse raster scan order.

Figure 20:
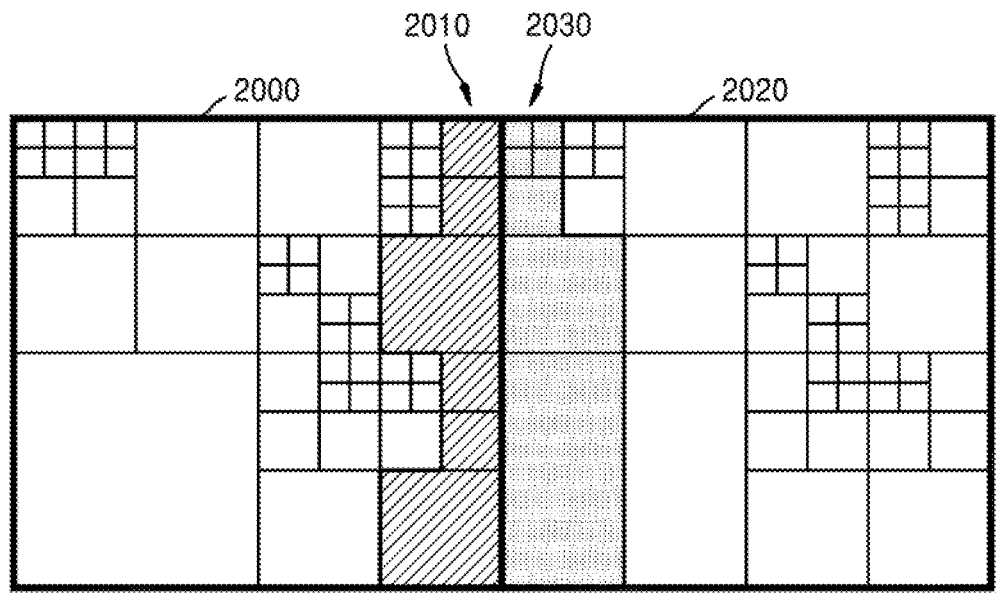
FIG. 20 illustrates a method of comparing coding efficiencies so as to determine whether to change an encoding order of blocks.

FIG. 20 illustrates a method of comparing coding efficiencies so as to determine whether to change an encoding order of blocks. FIG. 20 illustrates two blocks 2000 and 2020 to be encoded according to a raster scan order, sub-blocks 2010 that are included in the block 2000 and are adjacent to a right boundary of the block 2000, and sub-blocks 2030 that are included in the block 2020 and are adjacent to a left boundary of the block 2020.

According to the raster scan order, the block 2000 is encoded prior to the block 2020. Thus, the sub-blocks 2010 included in the block 2000 are encoded prior to the sub-blocks 2030 included in the block 2020.

When only the encoding order of the block 2000 and the block 2020 is changed without changing an encoding order of sub-blocks, the sub-blocks 2030 are encoded without encoding information about left and right sub-blocks such that coding efficiency of the sub-blocks 2030 may be decreased. On the other hand, the sub-blocks 2010 are encoded by using all of encoding information about left and right sub-blocks, coding efficiency of the sub-blocks 2010 may be increased.

Thus, whether a change in the encoding order of the block 2000 and the block 2020 is efficient may be determined by summing an increase in the coding efficiency of the sub-blocks 2010 and a decrease in the coding efficiency of the sub-blocks 2030. When the increase in the coding efficiency of the sub-blocks 2010 is greater than the decrease in the coding efficiency of the sub-blocks 2030, it is better to change the encoding order of the block 2000 and the block 2020. However, on the other hand, the decrease in the coding efficiency of the sub-blocks 2030 is greater than the increase in the coding efficiency of the sub-blocks 2010, it is better not to change the encoding order of the block 2000 and the block 2020.

Figure 21:
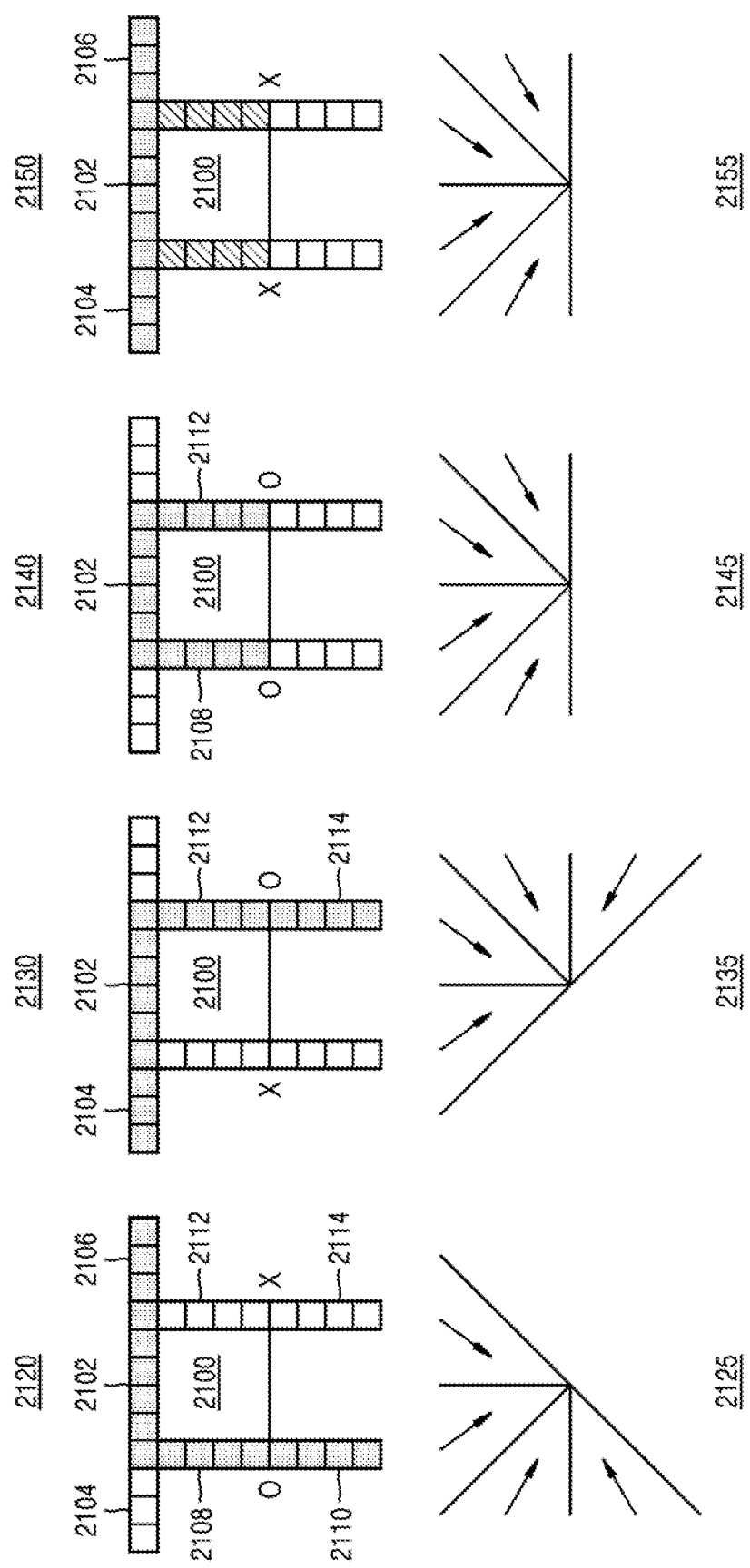
FIG. 21 illustrates a reference sample to be used when a block is predicted according to an intra mode.

FIG. 21 illustrates a reference sample to be used when a block 2100 is predicted according to an intra mode.

With reference to FIG. 21, a first embodiment 2120 illustrates reference pixels 2102, 2106, 2108, and 2110 used in intra prediction when blocks in an upper row and a left block are reconstructed. In the first embodiment 2120, the reference pixels 2102 and 2106 of the reconstructed upper blocks and the reference pixels 2108 of the reconstructed left block may be used in the intra prediction. The reference pixels 2110 of a lower left block may be used only when the lower left block is reconstructed. To use the reference pixels 2102, 2106, 2108, and 2110, prediction directions included in a first intra prediction direction group 2125 may be used in intra predicting the block 2100.

A second embodiment 2130 illustrates reference pixels 2102, 2104, 2112, and 2114 used in intra prediction when blocks in an upper row and a right block are reconstructed. In the second embodiment 2130, the reference pixels 2102 and 2104 of the reconstructed upper blocks and the reference pixels 2112 of the reconstructed right block may be used in the intra prediction. The reference pixels 2114 of a lower right block may be used only when the lower right block is reconstructed. To use the reference pixels 2102, 2104, 2112, and 2114, prediction directions included in a second intra prediction direction group 2135 may be used in intra predicting the current block 2100.

A third embodiment 2140 illustrates reference pixels 2102, 2108, and 2112 used in intra prediction when an upper block, a right block, and a left block are reconstructed. In the third embodiment 2140, the reference pixels 2102 of the upper block, the reference pixels 2108 of the left block, and the reference pixels 2112 of the right block may be used in the intra prediction. Prediction directions included in a third intra prediction direction group 2145 may be used in intra predicting the block 2100.

According to the first embodiment 2120 and the second embodiment 2130, when the reference pixels 2110 of the lower left block and the reference pixels 2114 of the lower right block cannot be used, accuracy of prediction may deteriorate. For example, in an upper-right direction mode, prediction according to the first embodiment 2120 may not be accurate. However, in the third embodiment 2140, the used reference pixels 2102, 2108, and 2112 are all adjacent to the block 2100, thus, accuracy of prediction may be relatively high, compared to other embodiments.

A fourth embodiment 2150 illustrates reference pixels 2102, 2104, and 2106 used in intra prediction when only blocks in an upper row are reconstructed. In the fourth embodiment 2150, only the reference pixels 2102, 2104, and 2106 of the reconstructed upper blocks may be used in the intra prediction. Prediction directions included in a fourth intra prediction direction group 2155 may be used in intra predicting the block 2100.

Unlike the third embodiment 2140, in the fourth embodiment 2150, the reference pixel 2102 of the upper block is the only pixel that is adjacent to the block 2100. Since the reference pixels 2104 and 2106 are spatially distant from the block 2100, accuracy of prediction may deteriorate, compared to the first, second, and third embodiments 2120, 2130, and 2140. Therefore, the intra prediction used in the fourth embodiment 2150 may be a vertical mode or a directional prediction mode in a direction adjacent to the vertical mode which uses the reference pixel 2102 of the upper block that is adjacent to the block 2100.

FIGS. 22A to 22E illustrate an intra prediction method to be performed on a current block when a right block of the current block is reconstructed by changing an encoding order of blocks.

Figure 22A:
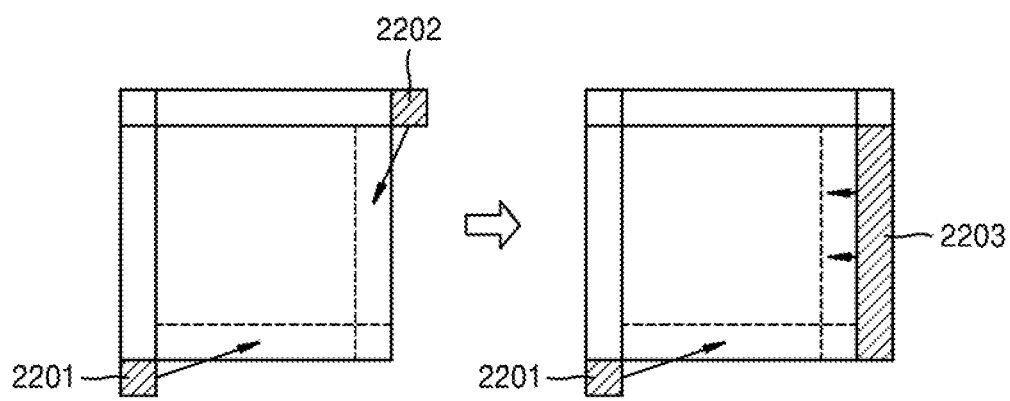

FIG. 22A illustrates an intra prediction method in a planar mode. The planar mode indicates an intra prediction mode in which a current pixel is predicted by performing double-interpolation on four pixels, based on a location of the current pixel, wherein the four pixels are from among pixels adjacent to a current block and are at a same row or same column of the current pixel. When an encoding order is not changed, a right block and a lower block of the current block are not reconstructed, thus, a lower left pixel 2201 and an upper right pixel 2202 are used instead of a lower pixel and a right pixel so as to predict the current pixel. However, when the encoding order is changed such that the right block of the current block is reconstructed, instead of the upper right pixel 2202, a pixel that is from among a right pixel 2203 and is located at the same row of the current pixel may be used as a reference pixel in the planar mode.

Figure 22B:
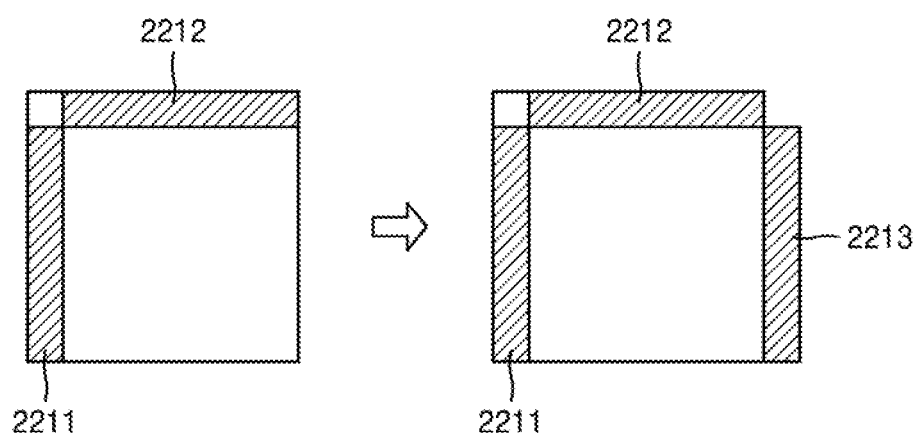

FIG. 22B illustrates an intra prediction method in a DC mode. In the DC mode, an average value of pixels adjacent to a current block becomes a prediction value for pixels included in the current block. When an encoding order is not changed, a right block and a lower block of the current block are not reconstructed, thus, left pixels 2211 and upper pixels 2212 are used in prediction according to the DC mode. However, when the encoding order is changed such that the right block of the current block is reconstructed, right pixels 2213 may be additionally used in the DC mode. Thus, an average value of pixel values of the left pixels 2211, the upper pixels 2212, and the right pixels 2213 may be used as a prediction value for pixels included in the current block.

Figure 22C:
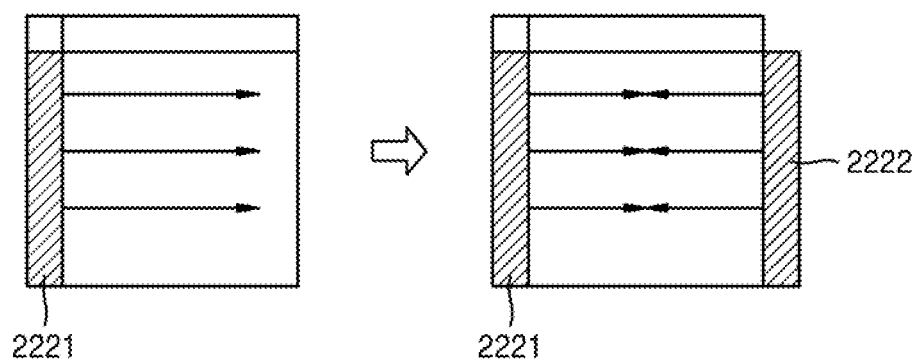

FIG. 22C illustrates an intra prediction method in a horizontal mode. In the horizontal mode, a pixel located in a horizontal direction of a current pixel is used in prediction of a current block. When an encoding order is not changed, a right block of the current block is not reconstructed, thus, only left pixels 2221 are used in prediction according to the horizontal mode. However, when the encoding order is changed such that the right block of the current block is reconstructed, right pixels 2222 may be additionally used in the horizontal mode. For example, a prediction value of the current pixel may be determined to be an average value of pixels that are from among the left pixels 2221 and the right pixels 2222 and are located in a horizontal direction of the current pixel. Alternatively, the prediction value of the current pixel may be determined by interpolating the pixels according to a location of the current pixel, wherein the pixels are from among the left pixels 2221 and the right pixels 2222 and are located in the horizontal direction of the current pixel.

Figure 22D:
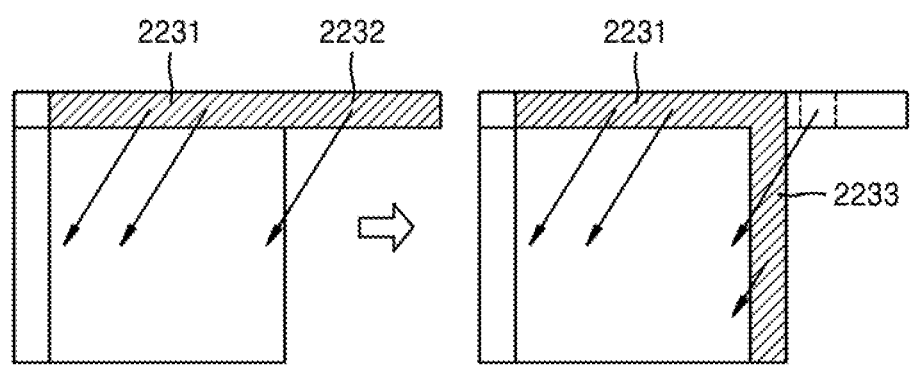

FIG. 22D illustrates an intra prediction method in an upper-right direction mode. In the upper-right direction mode, a pixel that is located in an upper-right direction of a current pixel is used in prediction of the current pixel. When an encoding order is not changed, a right block of a current block is not reconstructed, thus, upper right pixels 2232, instead of right pixels 2233, are used in prediction according to the upper-right direction mode. However, when the encoding order is changed such that the right block of the current block is reconstructed, the right pixels 2233 may be used in the upper-right direction mode. Because the right pixels 2233 are closer to the current block, compared to the upper right pixels 2232, the current block may be further accurately predicted.

FIG. 22E illustrates an intra prediction method in a lower-left direction mode. In the lower-left direction mode, a pixel that is located in a lower-left direction of a current pixel is used in prediction of the current pixel. When an encoding order is not changed, a right block of a current block is not reconstructed, thus, only left pixels 2241 and lower left pixels 2242 are used in prediction according to the lower-left direction mode. However, when the encoding order is changed such that the right block of the current block is reconstructed, right pixels 2243 may be used in the lower-left direction mode. For example, an average value of a pixel and another pixel may be determined to be a prediction value of the current pixel, wherein the pixel is located in a lower-left direction of the current pixel and is from among the left pixels 2241 and the lower left pixels 2242 and the other pixel is located in an opposite direction of the lower-left direction and is from among the right pixels 2243. Alternatively, the prediction value of the current pixel may be determined by interpolating the pixel and the other pixel, based on a location of the current pixel, wherein the pixel is located in a lower-left direction of the current pixel and is from among the left pixels 2241 and the lower left pixels 2242 and the other pixel is located in an opposite direction of the lower-left direction and is from among the right pixels 2243.

In an intra mode that is not described with reference to FIGS. 22A to 22E, a method of using right pixels of a current block may be used to increase accuracy of intra prediction.

FIG. 23 illustrates reference blocks to be used when a block 2300 is predicted according to an inter mode.

Only when a left block of the block 2300 of FIG. 23 is reconstructed, some of motion vectors with respect to blocks including reference pixels 2302, 2304, 2306, 2308, and 2310 are determined to be motion vector candidates of a first candidate list. One motion vector may be selected from among the motion vector candidates of the first candidate list, and a plurality of pieces of encoding information such as a reference picture index, or the like which are required for inter prediction may be obtained from a block including the selected motion vector.

When a right block of the block 2300 is only reconstructed, some of blocks including reference pixels 2302, 2310, 2312, 2316, and 2318 may be determined to be motion vector candidates of a second candidate list. Alternatively, some of motion vectors with respect to blocks including reference pixels 2302, 2308, 2310, 2314, and 2318 may be determined to be the motion vector candidates of the second candidate list. One motion vector may be selected from among the motion vector candidates of the second candidate list, and a plurality of pieces of encoding information such as a reference picture index, or the like which are required for inter prediction may be obtained from a block including the selected motion vector.

When the left and right blocks of the block 2300 are all reconstructed, an efficient candidate list from among the second candidate list and the first candidate list may be selected. Afterward, a motion vector may be determined from the selected candidate list. In another embodiment, when the left and right blocks of the current block 2300 are all reconstructed, a third candidate list that is different from the first candidate list and the second candidate list may be generated. For example, motion vectors with respect to blocks including reference pixels 2302, 2304, 2310, 2312, and 2316 may be included, as motion vector candidates, in the third candidate list.

When the left and right blocks of the block 2300 are not reconstructed, encoding information cannot be obtained from the left and right blocks. Therefore, a fourth candidate list including, as motion vector candidates, motion vectors with respect to blocks located at an upper row of the block 2300 may be used. For example, motion vectors with respect to blocks including reference pixels 2302, 2308, 2310, and 2312 may be included, as motion vector candidates, in the fourth candidate list.

In the Z encoding order, the inter prediction according to the first candidate list may be used. However, when an encoding order of two horizontally-neighboring blocks is changed, a right block may be first inter-predicted according to the second candidate list or the fourth candidate list. After the right block is reconstructed, a left block may be reconstructed by being inter-predicted according to one of the second candidate list and the third candidate list.

FIG. 24 illustrates a video decoding method performed by the video decoding apparatus 1600, according to an embodiment.

In operation 2410, encoding order information indicating whether an encoding order of neighboring blocks is changed is obtained.

In operation 2420, an encoding order of blocks is determined, based on the encoding order information.

In operation 2430, the blocks are decoded according to the determined encoding order.

According to the present embodiment, the encoding order information may indicate an encoding order of a first block and a second block that are adjacent to each other. When the encoding order information indicates that there is no change in the encoding order of the first block and the second block, the first block is first decoded. Then, encoding order information about the second block and a third block adjacent to the second block may be obtained.

On the other hand, when the encoding order information indicates that there is a change in the encoding order of the first block and the second block, the second block is first decoded. After the second block is decoded, the first block is decoded. After the first block is decoded, encoding order information about a third block and a fourth block may be obtained.

According to the present embodiment, encoding order information may indicate a direction of an encoding order. When the encoding order information indicates that the direction of the encoding order is equal to a default encoding order, blocks corresponding to the encoding order information are decoded in a same direction as the default encoding order. On the other hand, when the encoding order information indicates that the direction of the encoding order is opposite to the default encoding order, the blocks corresponding to the encoding order information are decoded in an opposite direction to the default encoding order.

The encoding order information may be implemented as a 1-bit size encoding order flag. Thus, the encoding order information may indicate whether or not the encoding order is equal to the default encoding order.

According to the present embodiment, the video decoding method may further include obtaining encoding order change allowance information indicating whether a change in an encoding order is allowed for blocks included in an upper data unit including a current block. Thus, only when the encoding order change allowance information indicates that a change in an encoding order is allowed for the current block, encoding order information about the current block may be obtained.

FIG. 25 illustrates a video encoding method performed by the video encoding apparatus 1700, according to an embodiment.

In operation 2510, whether an encoding order of neighboring blocks is changed is determined.

In operation 2520, blocks are encoded according to whether the encoding order is changed.

In operation 2530, a bitstream including encoding order information indicating whether the encoding order is changed and encoding information of the blocks is output.

The blocks of FIGS. 24 and 25 may be adjacent to each other in a horizontal direction or a vertical direction. Also, the blocks of FIGS. 24 and 25 may each be a largest coding unit or a data unit included in a largest coding unit.

According to the video encoding technique based on coding units having a tree structure which is described with reference to FIGS. 1 through 25, image data of a spatial domain is encoded in each of the coding units having a tree structure, and decoding is performed on each largest coding unit according to the video decoding technique based on coding units having a tree structure so that the image data of the spatial domain is reconstructed, and by doing so, a picture and a video that is a picture sequence may be reconstructed. The reconstructed video may be reproduced by a reproducing apparatus, may be stored in a storage medium, or may be transmitted through a network.

The embodiments according to the present disclosure may be written as computer programs and may be implemented in a general-use digital computer that executes the programs by using a computer-readable recording medium.

While the best embodiments of the present disclosure have been described, it will be understood by one of ordinary skill in the art that various replacements, modifications, or changes with respect to the present disclosure may be made therein without departing from the spirit and scope as defined by the following claims. That is, the claims will be construed as including the various replacements, modifications, or changes with respect to the present disclosure. Therefore, the descriptions provided in the specification and drawings should be considered in a descriptive sense only and not for purposes of limitation.

The invention claimed is:

1. A video decoding method comprising:
obtaining encoding order change allowance information with respect to an upper data unit comprising a first block and a second block, wherein the encoding order change allowance information indicates whether a change in an encoding order of blocks comprised in the upper data unit is allowed,
when the encoding order change allowance information indicates that the change in the encoding order of the blocks is allowed, obtaining encoding order information indicating whether the first block is decoded prior to the second block, the first block and the second, block being adjacent to each other, and determining an encoding order of the first block and the second block, based on the encoding order information;
when the encoding order change allowance information indicates that the change in the encoding order of the blocks is not allowed, determining the encoding order of the first block and second block, based on a default encoding order; and
decoding the first block and the second block, according to the determined encoding order,
wherein,
the encoding order change allowance information is obtained from a video parameter set, a sequence parameter set, a picture parameter set, or a slice segment header.

2. The video decoding method of claim 1, wherein the first block and the second block are adjacent to each other in a horizontal direction.

3. The video decoding method of claim 1, wherein each of the first block and the second block is a largest coding unit.

4. The video decoding method of claim 1, wherein,
when there is no change in the encoding order of the first block and the second block, the first block is decoded prior to the second block, and
when there is a change in the encoding order of the first block and the second block, the second block is decoded prior to the first block.

5. The video decoding method of claim 4, wherein, when there is the change in the encoding order of the first block and the second block, sub-blocks adjacent to a boundary between the first block and the second block are reconstructed by using a reconstruction result and encoding information of the second block, wherein the sub-blocks are from among sub-blocks comprised in the first block.

6. The video decoding method of claim 1, further comprising:
when there is no change in the encoding order of the first block and the second block, determining whether to change an encoding order of the second block and a third block that are adjacent to each other; and
when there is a change in the encoding order of the first block and the second block, determining whether to change an encoding order of the third block and a fourth block that are adjacent to each other.

7. A video encoding method comprising:
determining whether a change in an encoding order of blocks comprised in an upper data unit is allowed;
when the change in the encoding order of the blocks is allowed, determining whether a first block is decoded prior to a second block, the first block and the second block being adjacent to each other, and encoding the first block and the second block according to whether the encoding order is changed;
when the change in the encoding order of the blocks is not allowed, encoding the first block and the second block according to a default encoding order; and
outputting a bitstream comprising encoding order information indicating whether encoding order change allowance information indicating whether the change in the encoding order of blocks comprised in the upper data unit is allowed, the first block is decoded prior to the second block, the first block and the second block being adjacent to each other and encoding information of the first block and the second block,
wherein the upper data unit comprises the first block and the second block, and
the encoding order change allowance information is comprised in a video parameter set, a sequence parameter set, a picture parameter set, or a slice segment header.

* * * * *